US008615557B2

(12) United States Patent
Swink et al.

(10) Patent No.: US 8,615,557 B2
(45) Date of Patent: Dec. 24, 2013

(54) SYSTEMS, APPARATUS, METHODS AND COMPUTER-READABLE STORAGE MEDIA FACILITATING INFORMATION SHARING VIA COMMUNICATION DEVICES

(75) Inventors: Cristy Swink, Milton, GA (US); Jason Sikes, Carnation, WA (US); David Merkoski, San Francisco, CA (US); Benjamin Fineman, San Francisco, CA (US); Jonathan Solis Snydal, Oakland, CA (US); Alex Tam, San Francisco, CA (US); Sara Louise Todd, San Francisco, CA (US); Hannah Regier, Berkeley, CA (US); Megan Elisabeth Shia, San Francisco, CA (US); Christopher Marshall Turitzin, San Francisco, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 549 days.

(21) Appl. No.: 12/903,414

(22) Filed: Oct. 13, 2010

(65) Prior Publication Data

US 2011/0087749 A1    Apr. 14, 2011

Related U.S. Application Data

(60) Provisional application No. 61/251,717, filed on Oct. 14, 2009, provisional application No. 12/643,726, filed on Dec. 21, 2009.

(51) Int. Cl.
*G06F 15/16* (2006.01)
(52) U.S. Cl.
USPC ............................ 709/206; 709/202; 709/203
(58) Field of Classification Search
USPC .......................................... 709/206, 202, 203
See application file for complete search history.

(56) References Cited

U.S. PATENT DOCUMENTS

| 5,072,412 | A | 12/1991 | Henderson, Jr. et al. |
| 5,233,687 | A | 8/1993 | Henderson, Jr. et al. |
| 5,394,521 | A | 2/1995 | Henderson, Jr. et al. |
| 5,838,326 | A | 11/1998 | Card et al. |
| 5,847,709 | A | 12/1998 | Card et al. |
| 6,367,020 | B1 | 4/2002 | Klein |
| 6,401,209 | B1 | 6/2002 | Klein |
| 7,286,063 | B2 | 10/2007 | Gauthey et al. |

(Continued)

OTHER PUBLICATIONS

Hayton et al. WO 2008/107675. Multi-media Messaging System for Mobile Telephone. Sep. 12, 2008.*

(Continued)

*Primary Examiner* — Nicholas Taylor
(74) *Attorney, Agent, or Firm* — Turocy & Watson, LLP

(57) ABSTRACT

Systems, apparatus, methods and computer-readable storage media facilitating information sharing via a communication device are described. In some embodiments, a method includes: generating a text message shell; providing concurrent access to a plurality of different types of content, wherein the plurality of different types of content includes website information; receiving a signal indicative of content selected from the plurality of different types of content, wherein the content is to be included in the text messaging shell; and generating a text message including the content. In some embodiments, providing concurrent access to the plurality of different types of content comprises providing concurrent access to one or more of contacts information, media or geographical location information for the communication device, and wherein the website information comprises a uniform resource locator or a website title.

20 Claims, 18 Drawing Sheets

(56) References Cited

U.S. PATENT DOCUMENTS

| | | |
|---|---|---|
| 7,308,926 B1 | 12/2007 | Hawkins |
| 7,322,626 B2 | 1/2008 | Thomas |
| 7,324,333 B2 | 1/2008 | Allen |
| 7,376,669 B2 | 5/2008 | Klein |
| 7,443,665 B2 | 10/2008 | Allen |
| 7,453,443 B2 | 11/2008 | Rytivaara et al. |
| 7,478,436 B1 | 1/2009 | Sheih et al. |
| 7,606,024 B2 | 10/2009 | Boss et al. |
| 7,620,982 B2 | 11/2009 | Ishidera |
| 7,628,335 B2 | 12/2009 | Morimoto et al. |
| 7,636,033 B2 | 12/2009 | Golden |
| 7,640,293 B2 | 12/2009 | Wilson et al. |
| 7,657,849 B2 | 2/2010 | Chaundhri et al. |
| 7,933,609 B2 * | 4/2011 | Lagerstedt et al. ......... 455/456.1 |
| 7,953,859 B1 | 5/2011 | Kiefhaber et al. |
| 8,316,095 B1 | 11/2012 | Wheeler et al. |
| 2001/0044903 A1 | 11/2001 | Yamamoto et al. |
| 2002/0056046 A1 | 5/2002 | Klein |
| 2002/0077079 A1 | 6/2002 | Ishihara |
| 2002/0099960 A1 | 7/2002 | Klein |
| 2002/0114654 A1 | 8/2002 | Abe et al. |
| 2003/0023688 A1 | 1/2003 | Denenberg et al. |
| 2003/0025840 A1 | 2/2003 | Arling |
| 2003/0074575 A1 | 4/2003 | Hoberock et al. |
| 2003/0074590 A1 | 4/2003 | Fogle et al. |
| 2003/0120957 A1 | 6/2003 | Pathiyal |
| 2003/0172495 A1 | 9/2003 | Pan |
| 2003/0191960 A1 | 10/2003 | Hung-yi |
| 2003/0206224 A1 | 11/2003 | Sakakibara et al. |
| 2004/0034561 A1 | 2/2004 | Smith |
| 2004/0046018 A1 | 3/2004 | Dobbins |
| 2004/0082322 A1 | 4/2004 | Tani |
| 2004/0085351 A1 | 5/2004 | Tokkonen |
| 2004/0092247 A1 | 5/2004 | Tani |
| 2004/0113491 A1 | 6/2004 | Mauser |
| 2004/0113819 A1 | 6/2004 | Gauthey |
| 2004/0123135 A1 | 6/2004 | Goddard |
| 2004/0137884 A1 | 7/2004 | Engstrom et al. |
| 2004/0189439 A1 | 9/2004 | Cansino |
| 2004/0220913 A1 | 11/2004 | Walker |
| 2005/0085215 A1 | 4/2005 | Kokko et al. |
| 2005/0117564 A1 | 6/2005 | Vieri et al. |
| 2005/0234910 A1 | 10/2005 | Buchheit et al. |
| 2005/0253817 A1 | 11/2005 | Rytivaara et al. |
| 2005/0282135 A1 | 12/2005 | Berman |
| 2006/0012577 A1 | 1/2006 | Kyrola |
| 2006/0075250 A1 | 4/2006 | Liao |
| 2006/0176661 A1 | 8/2006 | Allen |
| 2006/0184351 A1 | 8/2006 | Corston-Oliver et al. |
| 2006/0195474 A1 | 8/2006 | Cadiz et al. |
| 2006/0253371 A1 | 11/2006 | Rutt et al. |
| 2006/0255907 A1 | 11/2006 | Min |
| 2006/0271526 A1 | 11/2006 | Charnock et al. |
| 2006/0282772 A1 | 12/2006 | Chamberlin et al. |
| 2006/0291157 A1 | 12/2006 | Allen |
| 2006/0291158 A1 | 12/2006 | Allen |
| 2007/0085839 A1 | 4/2007 | Yang et al. |
| 2007/0088687 A1 | 4/2007 | Bromm et al. |
| 2007/0119952 A1 | 5/2007 | Morimoto et al. |
| 2007/0133802 A1 | 6/2007 | Yuan |
| 2007/0135091 A1 | 6/2007 | Wassingbo |
| 2007/0144225 A1 | 6/2007 | Tamura |
| 2007/0150842 A1 | 6/2007 | Chaudhri et al. |
| 2007/0161410 A1 | 7/2007 | Huang et al. |
| 2007/0203982 A1 | 8/2007 | Jagoe et al. |
| 2007/0204064 A1 * | 8/2007 | Mail et al. .................... 709/246 |
| 2007/0220542 A1 | 9/2007 | Kim |
| 2007/0247276 A1 | 10/2007 | Murchison et al. |
| 2007/0282839 A1 | 12/2007 | Walker |
| 2008/0036747 A1 | 2/2008 | Hope |
| 2008/0049135 A1 | 2/2008 | Okudaira |
| 2008/0055276 A1 | 3/2008 | Chang |
| 2008/0059880 A1 | 3/2008 | Cato et al. |
| 2008/0064370 A1 | 3/2008 | Fukaya et al. |
| 2008/0122796 A1 | 5/2008 | Jobs et al. |
| 2008/0153459 A1 | 6/2008 | Kansal et al. |
| 2008/0189122 A1 | 8/2008 | Coletrane et al. |
| 2008/0189623 A1 | 8/2008 | Patil |
| 2008/0207166 A1 | 8/2008 | Aerrabotu et al. |
| 2008/0222636 A1 | 9/2008 | Wang et al. |
| 2008/0229397 A1 | 9/2008 | Basner et al. |
| 2008/0281610 A1 | 11/2008 | Yoshida et al. |
| 2009/0006991 A1 | 1/2009 | Lindberg et al. |
| 2009/0034804 A1 | 2/2009 | Cho et al. |
| 2009/0040018 A1 | 2/2009 | Lee et al. |
| 2009/0044578 A1 | 2/2009 | Boss et al. |
| 2009/0061823 A1 | 3/2009 | Chu |
| 2009/0066489 A1 | 3/2009 | Golden |
| 2009/0102803 A1 | 4/2009 | Newman et al. |
| 2009/0104925 A1 | 4/2009 | Aula |
| 2009/0128335 A1 | 5/2009 | Leung |
| 2009/0157732 A1 | 6/2009 | Hao et al. |
| 2009/0167717 A1 | 7/2009 | Wang et al. |
| 2009/0170553 A1 | 7/2009 | Wang et al. |
| 2009/0187676 A1 | 7/2009 | Griffin et al. |
| 2009/0215479 A1 * | 8/2009 | Karmarkar .................... 455/466 |
| 2009/0234935 A1 * | 9/2009 | Watson et al. ................ 709/219 |
| 2009/0245484 A1 | 10/2009 | Bates |
| 2009/0259968 A1 | 10/2009 | Hsieh et al. |
| 2009/0264117 A1 | 10/2009 | Hsieh et al. |
| 2009/0264157 A1 | 10/2009 | Hsieh et al. |
| 2009/0265666 A1 | 10/2009 | Hsieh et al. |
| 2009/0288032 A1 | 11/2009 | Chang et al. |
| 2009/0327263 A1 | 12/2009 | Maghoul |
| 2010/0009727 A1 | 1/2010 | Presutti |
| 2010/0071423 A1 | 3/2010 | Dehaan et al. |
| 2010/0079380 A1 | 4/2010 | Nurmi |
| 2010/0082684 A1 | 4/2010 | Churchill et al. |
| 2010/0094939 A1 | 4/2010 | Cheng et al. |
| 2010/0105440 A1 | 4/2010 | Kruzeniski et al. |
| 2010/0127998 A1 | 5/2010 | Hyun |
| 2010/0145951 A1 | 6/2010 | Van Coeverden De Groot et al. |
| 2010/0156594 A1 | 6/2010 | Chaikin et al. |
| 2010/0159995 A1 | 6/2010 | Stallings et al. |
| 2010/0162133 A1 | 6/2010 | Pascal et al. |
| 2010/0164740 A1 | 7/2010 | Lo et al. |
| 2010/0199359 A1 | 8/2010 | Miki |
| 2010/0207723 A1 | 8/2010 | Cao et al. |
| 2010/0214237 A1 | 8/2010 | Echeverri et al. |
| 2010/0223097 A1 | 9/2010 | Kramer et al. |
| 2010/0257490 A1 | 10/2010 | Lyon et al. |
| 2010/0309149 A1 | 12/2010 | Blumenberg et al. |
| 2010/0325155 A1 * | 12/2010 | Skinner et al. ................ 707/770 |
| 2011/0035673 A1 | 2/2011 | Chou et al. |
| 2011/0035708 A1 | 2/2011 | Damale |
| 2011/0062143 A1 | 3/2011 | Satanek et al. |
| 2011/0081922 A1 | 4/2011 | Chandra et al. |
| 2011/0169909 A1 | 7/2011 | Gu |
| 2012/0319985 A1 | 12/2012 | Moore et al. |

OTHER PUBLICATIONS

"Global Framewor—UE Flows and Screen Details". AT&T Armstrong Project. Version 1.10. Last accessed Jun. 16, 2010, 166 pages.

"Global Framework—VD Specification". AT&T Armstrong project. Version 1.11. Last accessed Jun. 16, 2010, 117 pages.

"Phone Top—UE Flows and Screen Details". AT&T Armstrong Project. Version 1.18. Last accessed Jun. 16, 2010, 104 pages.

"Phone Top—VD Specification". AT&T Armstrong Project. Version 1.12. Last accessed Jun. 16, 2010, 52 pages.

"Phone / Dialer—UE Flows and Screen Details". AT&T Armstrong Project. Version 1.8. Last accessed Jun. 16, 2010, 57 pages.

"Dialer—VD Specification". AT&T Armstrong Project. Version 1.7. Last accessed Jun. 16, 2010, 19 pages.

"Contacts—UE Flows and Screen Details". AT&T Armstrong Project. Version 2.6. Last accessed Jun. 16, 2010, 142 pages.

"Contact—VD Specification". AT&T Armstrong Project. Version 2.2. Last accessed Jun. 16, 2010. 48 pages.

"Third-Party Pickers—UE Flows and Screen Details". AT&T Armstrong Project. Version 1.1. Last accessed Jun. 16, 2010, 23 pages.

(56) References Cited

OTHER PUBLICATIONS

"3rd Party Pickers". AT&T C@lumbus Project. Version 1.1. Last accessed Jun. 16, 2010, 7 pages.
"Social—UE Flows and Screen Details". AT&T C@lumbus Project. Version 1.5. Last accessed Jun. 16, 2010, 107 pages.
"Social—VD Specification". AT&T C@lumbus Project. Version 1.5. Last accessed Jun. 16, 2010, 39 pages.
"Media App—UE Flows and Screen Details". AT&T Armstrong Project. Version 1.6. Last accessed Jun. 16, 2010, 118 pages.
"Media—VD Specification". AT&T Armstrong Project. Version 1.3. Last accessed Jun. 16, 2010, 29 pages.
"Mobile Shar—Reduced Scope; UE Flows and Screen Details". AT&T Armstrong Project. Version 1.2 RS. Last accessed Jun. 16, 2010, 59 pages.
"Mobile Share (Reduced Scope)". AT&T Armstrong Project. Version 1.2RS. Last accessed Jun. 16, 2010, 15 pages.
"Camera App—UE Flows and Screen Details". AT&T Armstrong Project. Version 1.8. Last accessed Jun. 16, 2010, 77 pages.
"Camera—VD Specification". AT&T Project. Version 1.8. Last accessed Jun. 16, 2010, 22 pages.
"Alarm Clock—UE Flows and Screen Details". AT&T Armstrong Project. Version 1.4. Last accessed Jun. 16, 2010, 35 pages.
"Alarm Clock—VD Specification". AT&T Armstrong Project. Version 1.4. Last accessed Jun. 16, 2010, 18 pages.
"Settings—UE Flows and Screen Details". AT&T Armstrong Project. Version 1.18. Last accessed Jun. 16, 2010, 180 pages.
"Settings—VD Specification". AT&T Armstrong Project. Version 1.8. Last accessed Jun. 16, 2010, 40 pages.
"Conversations—UE Flows and Screen Details". AT&T Armstrong Project. Version 1.3. Last accessed Jun. 16, 2010, 148 pages.
"Conversations". AT&T Armstrong Project. Version 1.5. Last accessed Jun. 16, 2010, 54 pages.
"Firmware Over the Air Updates—UE Flows and Screen Details". AT&T Armstrong Project. Version 1.9. Last accessed Jun. 16, 2010, 39 pages.
Paul McDougall. Browser. AT&T Armstrong Project. Version 1.3. Last accessed Jun. 16, 2010, 6 pages.
Paul McDougall. Maps. AT&T Armstrong Project. Version 1.3. Last accessed Jun. 16, 2010, 8 pages.
"Reference Guide". AT&T Armstrong Project. Version 1.0. Last accessed Jun. 16, 2010, 4 pages.
D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM&CFID=23778768 &CFTOKEN=77139655.
http://www.siliconvalleywatcher.com/mt/archives/2010/04/panama_kill_voi.php.
http://www.google.com/support/forum/p/voice/thread?tid=64d1c9d5fb45cccf&hl=en.
Bob Tedeschi, Group Texting Grows Up, With Features That Appeal to Adults. http://www.nytimes.com/2010/10/21/technology/personaltech/21smart.html. Last accessed Nov. 1, 2010, 3 pages.
A Teenager's Dream: An iPhone App for Free Texting—Bits Blog—NYTimes.com. http://bits.blogs.nytimes.com/2009/08/25/a-teens-dream-an-iphone-app-for-tree-texting. Last accessed Oct. 13, 2009, 19 pages.
Build and grow with Facebook Connect. http://developers.facebook.com/connect.php?tab=website. Last accessed Nov. 2, 2009, 2 pages.
Build and grow with Facebook Connect. http://developers.facebook.com/connect.php?tab=iphone. Last acceseed Nov. 2, 2009, 1 pages.
http://www.sprint.com/cdma/assets/pdfs/phone_guides/palm/palm_pre_p100_ug.pdf at pp. 44, 57-58. Last accessed Nov. 6, 2009, 3 pages.
MTN—Meeting the needs of the South African market for a new mobile messaging solution—Mobile IM. http://www.moviuscorp.com/files/case_study_mtn.pdf. Last accessed Nov. 2, 2009, 5 pages.
http://www.bizzia.com/buzznetworker/social-web-aggregation. Last accessed Nov. 6, 2009, 4 pages.
Alexander The Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.
Schroeder, 20 Ways To Aggregate Your Social Networking Profiles, http://mashable.com/2007/07/17/social-network-aggregators/, Jul. 17, 2007, 20 pages.
Hirsch, iPhone 2.0 Apps: The Social Networking App Comparison, http://mashable.com/2008/07/17/iphone-social-networking-app-comparison/, Jul. 17, 2008, 9 pages.
Lifestream: Bebo's new social media aggregation tool | Media | guardian.co.uk, http://www,guardian.co.uk/media/pda/2009/feb/23/socialnetworking-bebo, Last Accessed Nov. 6, 2009, 3 pages.
Wikipedia, Social network aggregation—Widipedia, the free encyclopedia, http://en.wikipedia.org/wiki/Social_Network_Aggregation, Last Accessed Nov. 6, 2009, 3 pages.
Jaiku | Your Conversation, www.jaiku.com, Last accessed Nov. 6, 2009, 3 pages.
StumbleUpon.com: Personalized Recommendations to Help You Discover the Best of the . . . , www.stumbleupon.com, Last accessed Nov. 6, 2009, 2 pages.
The Walt Disney Internet Group, www.dig.com, Last accessed Nov. 6, 2009, 1 page.
Delicioussocial bookmarking, www.del.icio.us, Last accessed Nov. 6, 2009, 6 pages.
Google Wave—Wikipedia, the free encyclopedia, http://en.wikipedia.org/wiki/Google_wave, Last accessed Dec. 18, 2009, 5 pages.
Motorola Backflip (TM )—Wireless from AT&T, http://www.wireless.att.com/cell-phone-service/cell-phone-sales/promotion/motobackflip.jsp, Last Accessed Mar. 29, 2010, 2 pages.
MOTOBLUR—Motorola USA, http://www.motorola.com/Consumers/US-EN/Consumer-Product-and-Services/MOTOBL . . . , Last accessed Mar. 29, 2010, 3 pages.
OA dated Apr. 6, 2012 for U.S. Appl. No. 12/643,726, 43 pages.
OA dated Jun. 12, 2012 for U.S. Appl. No. 12/903,618, 41 pages.
"Brads Live: AddressBooker & exporting my Facebook Phonebook" http://brad.livejournalcom/2398409.html as archived on archive.org on Dec. 5, 2008.
OA dated Aug. 1, 2012 for U.S. Appl. No. 12/903,632, 47 pages.
OA dated Sep. 7, 2012 for U.S. Appl. No. 12/902,979, 63 pages.
OA dated Nov. 14, 2011 for U.S. Appl. No. 12/643,726 , 59 pages.
Spagnuolo-Tweetdeck, http://edgehopper.com/how-to-use-tweetdeck-the-ultimate-twitter-client/,Feb. 12, 2009, 11 pages.
OA dated Feb. 11, 2013 for U.S. Appl. No. 12/902,979, 53 pages.
OA dated Jan. 30, 2013 for U.S. Appl. No. 12/903,632, 28 pages.
OA dated Dec. 20, 2012 for U.S. Appl. No. 12/903,679, 40 pages.
OA dated Mar. 13, 2013 for U.S. Appl. No. 12/643,726, 55 pages.
OA dated Jun. 13, 2013 for U.S. Appl. No. 12/903,382, 53 pages.
Office Action dated Aug. 23, 2013 for U.S. Appl. No. 12/643,726, 61 pages.
Office Action dated Nov. 1, 2013 for U.S. Appl. No. 12/903,382, 30 pages.
Office Action dated Sep. 26, 2013 for U.S. Appl. No. 12/903,618, 36 pages.
Office Action dated Oct. 11, 2013 for U.S. Appl. No. 12/903,679, 22 pages.

\* cited by examiner

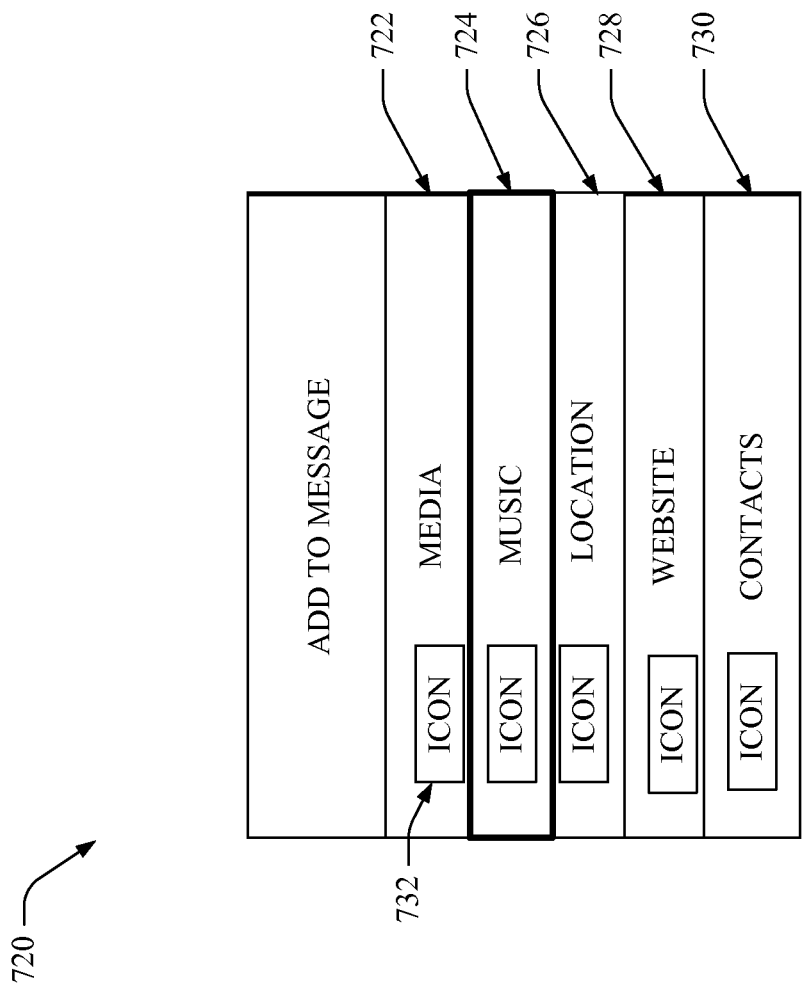

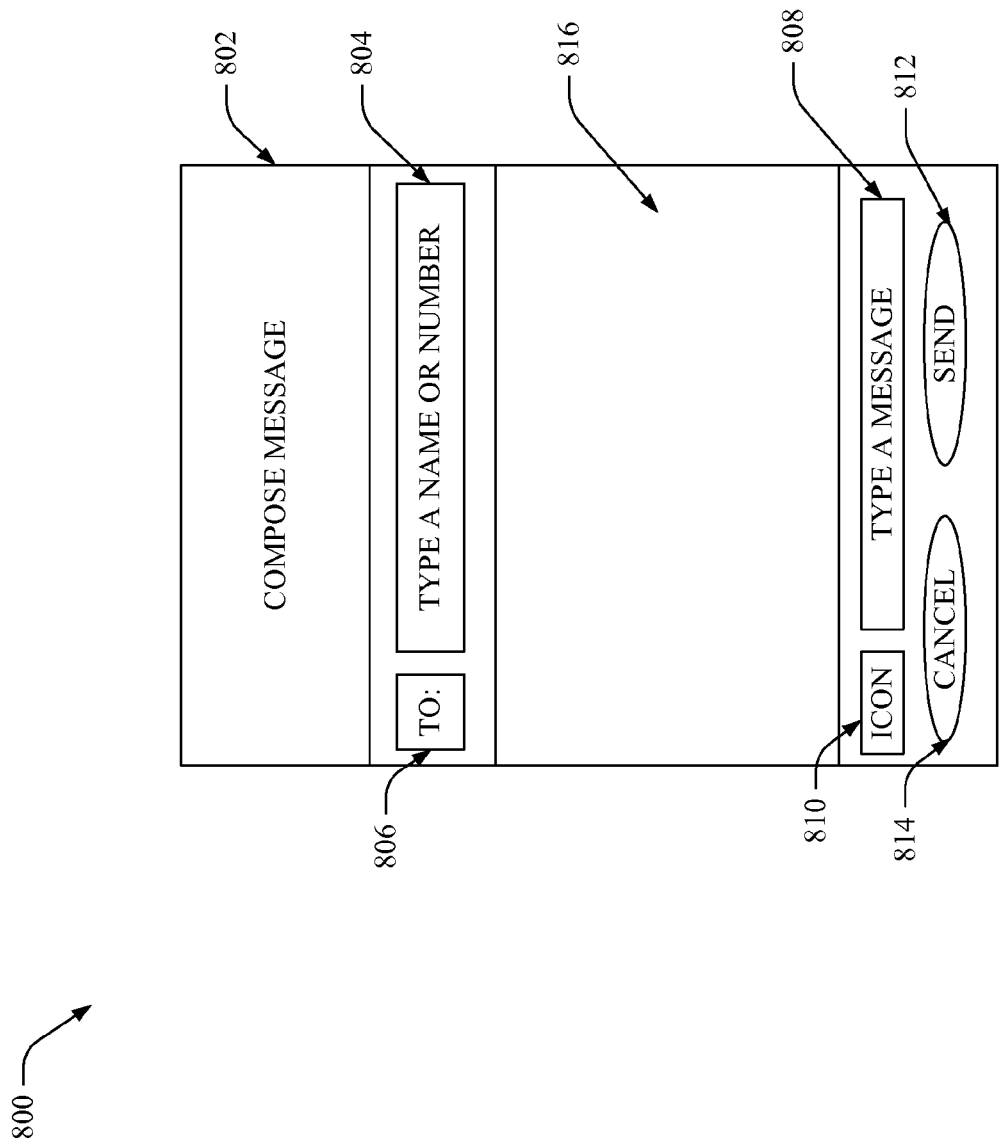

SYSTEMS, APPARATUS, METHODS AND COMPUTER-READABLE STORAGE MEDIA FACILITATING INFORMATION SHARING VIA COMMUNICATION DEVICES

CROSS-REFERENCES TO RELATED APPLICATIONS

This application claims priority to and the benefit of U.S. Provisional Application No. 61/251,717, filed Oct. 14, 2009, titled "SYSTEMS, METHODS AND APPARATUS FOR NEXT-GENERATION MOBILE MESSAGING," and U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY," the entire contents of which are incorporated herein by reference.

BACKGROUND

With advancements in technology, communication devices are becoming ubiquitous in today's society due to convenience of use resultant from their lightweight nature and extensive information processing capabilities. With the onslaught of technology, the amount and type of information that can be shared amongst and between communication devices is ever-increasing. Conventional systems typically encumber the process of sharing information by requiring users to obtain electronic mail (email) accounts, access to devices connected to such networks and in-depth knowledge of how to access and use such accounts and networks. Further, sharing information by email can be time-consuming and somewhat complex, depending on the type of information being disseminated. Accordingly, systems, apparatus, methods and computer-readable storage media for sharing information via communication devices are desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein are systems, apparatus, methods and computer-readable storage media facilitating information sharing for communication devices.

In one aspect, a computer-implemented method is provided. The computer-implemented method can include: generating a text message shell; providing concurrent access to a plurality of different types of content, wherein the plurality of different types of content includes website information; receiving a signal indicative of content selected from the plurality of different types of content, wherein the content is to be included in the text messaging shell; and generating a text message including the content.

In another aspect, an apparatus is provided. The apparatus can include: a processor; and an information sharing component configured to: generate a text message shell; provide concurrent access to a plurality of different types of content, wherein the plurality of different types of content includes website information; receive a signal indicative of content selected from the plurality of different types of content, wherein the content is to be included in the text messaging shell; and generate a text message including the content. The apparatus can also include a computer-readable storage medium storing computer-executable instructions that, if executed, cause the processor to perform one or more functions of the information sharing component.

In another aspect, a computer-readable storage medium is provided. The computer-readable storage medium can store computer-executable instructions that, if executed on a processor of a communication device, cause the communication device to: generate a text message shell; provide concurrent access to a plurality of different types of content, wherein the plurality of different types of content includes website information; receive a signal indicative of content selected from the plurality of different types of content, wherein the content is to be included in the text messaging shell; and generate a text message including the content.

BRIEF DESCRIPTION OF THE DRAWINGS

Non-limiting and non-exhaustive embodiments of various aspects detailed herein are described with reference to the following figures, wherein like reference numerals refer to like parts.

FIGS. 7A, 7B, 7C, 7D, 8A, 8B, 8C, 8D, 8E and 8F illustrate display regions of user interfaces (UIs) facilitating information sharing for communication devices in accordance with various aspects described herein.

DETAILED DESCRIPTION

Figure 1:
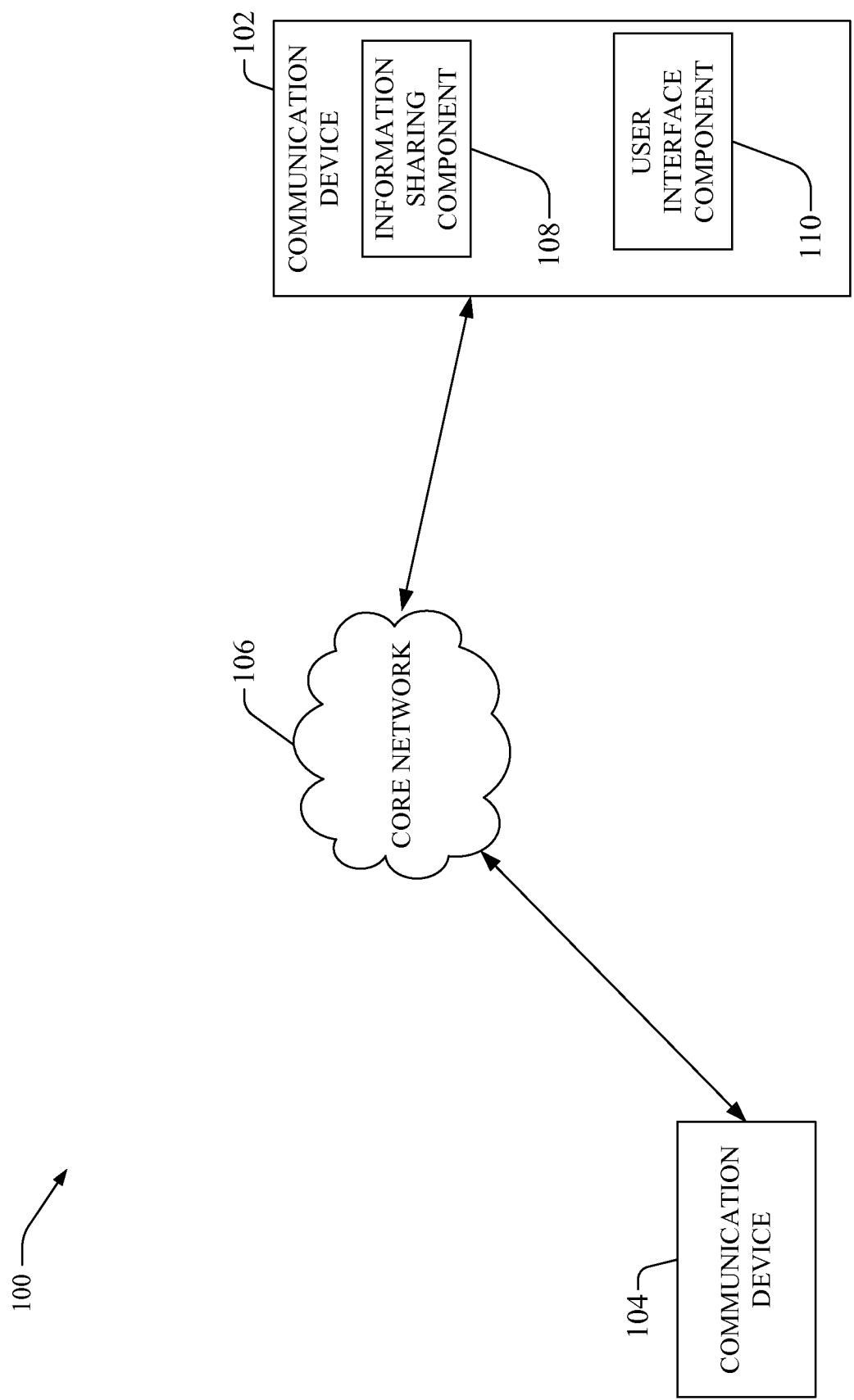
FIG. 1 illustrates a block diagram of an exemplary system that facilitates information sharing for communication devices in accordance with various aspects and embodiments described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

FIG. 1 illustrates a block diagram of an exemplary system that facilitates information sharing for a communication device in accordance with various aspects and embodiments described herein. In an aspect, the system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 200 described herein (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, video, news, financial or stock information servers.

The core network 106 can also include short message service (SMS) networks and multimedia message service (MMS) networks. The core network 106 can also include but is not limited to, routers, nodes, switches, interfaces, and/or controllers that can facilitate communication of data to or from the communication devices 102, 104. The core network 106 can transmit and receive voice, text, pictorial, video, audio and/or data traffic to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of multimedia servers (not shown), email servers (not shown), databases (not shown), Internet (not shown) for communicating one or more of text or email messages, data, pictures, multimedia, voice or video.

The core network 106 can also include databases and/or memory storing information and/or computer-readable storage media storing computer-executable instructions enabling various operations by the communication devices 102, 104. In some embodiments, the core network 106 can include databases and/or memory storing computer-executable instructions and/or settings for providing information sharing to, from or within the communication devices 102, 104. In some embodiments, a database can store settings, and/or memory can store computer-executable instructions, enabling the communication device 104 to provide information sharing as described in greater detail herein.

In various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but is not limited to, MMS, SMS, WLAN, WiFi, WiMAX, BLUETOOTH® protocol, text messaging, instant messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104.

In some embodiments, the communication devices 102, 104 can include hardware, software and/or a combination of hardware and software to facilitate providing information sharing to, from or within the communication devices 102, 104 as described herein. For example, in various embodiments, as shown at communication device 102, the communication devices 102, 104 can include an information sharing component 108 and a UI component 110 for information sharing via the communication device 102. In various embodiments, the UI component 110 can facilitate receiving or outputting information for providing or enabling the one or more information sharing functions or protocols, providing or enabling communication to or from the communication device 102, accessing information stored within, or storing information within, the communication device 102, or any controlling the communication device 102, or receiving information output from the communication device 102, via the UI component 110.

While information sharing methods and communication devices facilitating such are described below with reference communication device 200, in various embodiments, the communication device 200 can be or include one or more of the functions or structure (or portions thereof) of communication device 102, 104 (and vice versa).

Figure 2:
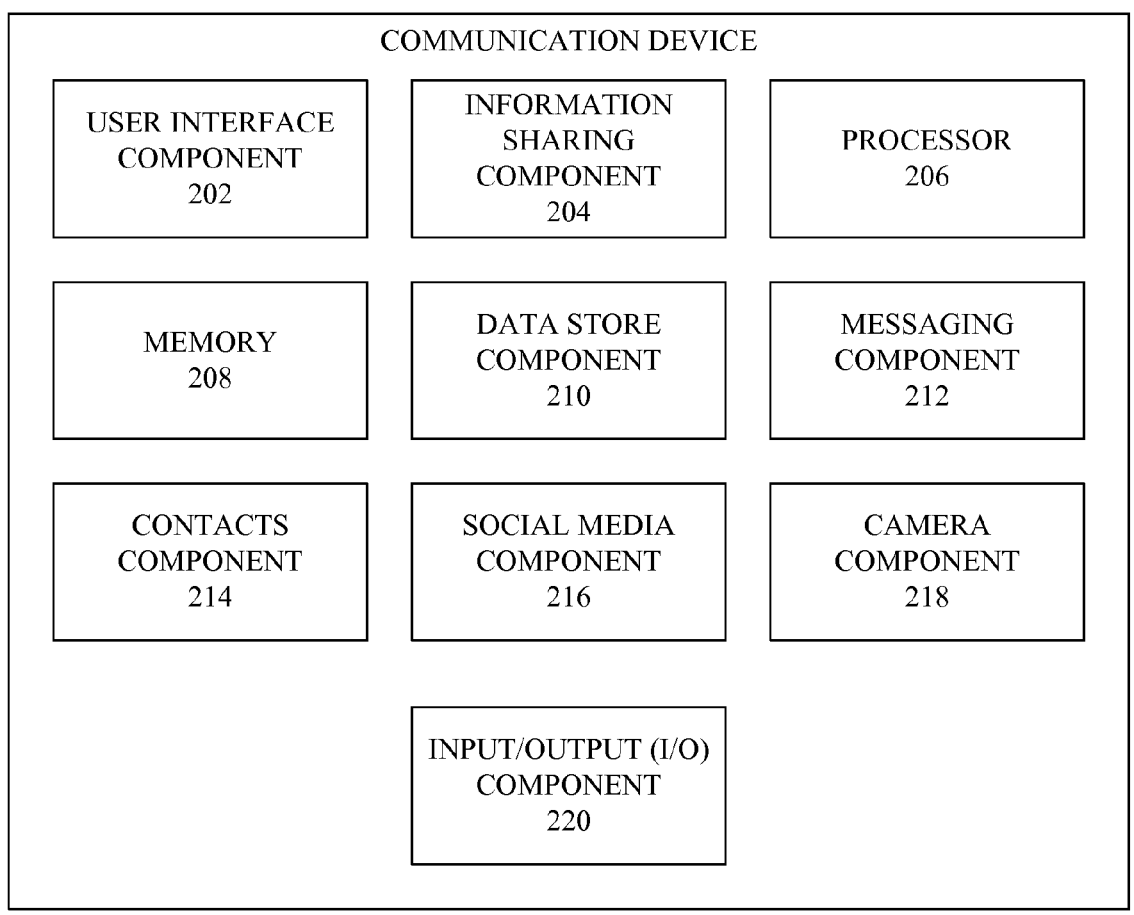
FIG. 2 illustrates a block diagram of an exemplary communication device in which information sharing can be facilitated in accordance with various aspects and embodiments described herein.

Turning now to FIG. 2, FIG. 2 illustrates a block diagram of a communication device for which information sharing is facilitated in accordance with various aspects and embodiments described herein. The communication device 200 can include a UI component 202, an information sharing component 204, a processor 206, a memory 208, a messaging component 212 and an input/output (I/O) component 220. In various embodiments, the communication device 200 can also include a contacts component 214, a messaging component 212, a social media component 216, a camera component 218 and/or a data store component 210. One or more of the components can be communicatively coupled to one another to perform the functions of the communication device 200 described herein.

Referring first to the I/O component 220, the I/O component 220 can include hardware, software and/or a combination of hardware and software facilitating receipt and output of information to and from the communication device 200. The receipt and output of such information can be utilized to provide information sharing from the communication device 200.

In some embodiments, information retrieved can be content, such as images photographed with camera component 218. Such images can be retrieved from an environment outside of the communication device 200, and processed and/or stored within or by the communication device 200 using the I/O component 220 in conjunction with the camera component 218.

Turning now to the UI component 202, the UI component 202 can include hardware, software and/or a combination of hardware and software facilitating sharing (e.g., transmission or reception) of information from the communication device. Because information and UI displays for information sharing can be provided via the UI component, the UI component 202 can work in conjunction with the I/O component 220 and the information sharing component 204 (which is described in greater detail below).

The UI component 202 can control the UI for the communication device 200. The UI can be any number of different types of UIs including, but not limited to, a graphical user interface (GUI), a touch-sensitive interface (e.g., a touch display region), an interface having capability for receiving graphics (e.g., maps), text (e.g., URLs), audio or video input (and outputting graphics, text, audio and video information) and the like. For example, the UI can be configured to provide output of graphics, text, audio and/or video that can be disseminated via a text message. In some embodiments described herein, the UI can include a touch display region configured to receive inputs at the touch display region and output information for information sharing from the communication device 200.

Turning now to the information sharing component 204, the information sharing component 204 can include software, hardware and/or a combination of hardware and software for providing information sharing for the communication device 200. In some embodiments, the information sharing component 204 can be natively integrated into various locations in the communication device 200. For example, the information sharing component 204 can be natively integrated into the messaging component 212 discussed below and able to execute applications for management of conversations. The information sharing component 204 can also be natively integrated into media applications and/or the portion of the data store component 220 into which media is stored.

In various embodiments, information sharing can include, but is not limited to, creation and/or transmission of text messages (e.g., MMS and SMS messages, for example) including URLs, websites, graphical location information (e.g., map images) and/or textual location information (e.g., URLs or links to map images, and/or street address information or business name information) corresponding to the location of the communication device 200, audio files, video files, photos and the like. For the various embodiments described herein, in some cases, the information sharing component 204 can facilitate information sharing via SMS, instant messages and/or electronic mail messages in addition to or in lieu of via MMS messages. Additionally, while embodiments herein are generally described for text messages, creation and/or dissemination of electronic invites (e-vites), including URL, website information, audio, video, pictorial and other types of content, can also be facilitated by the information sharing component 204 and the embodiments described for text messages can also apply for electronic invites transmitted or received over MMS or SMS networks.

The information sharing component can operate according to one or more information sharing protocols or methods described herein. In some embodiments, the information sharing protocol can utilize a number of approaches for dissemination of information from, or retrieval of information to, the communication device 200. In some embodiments, information sharing protocols can include, for example, composing a text message and attaching content to the text message. The information sharing component 204 can provide access to numerous different types of content including, but not limited to, URLs, location information for the communication device 200 (e.g., maps and links to the location of the communication device), photos, images, audio files, and the like.

In some embodiments, information sharing protocols can include organization protocols, rules and/or policies for structuring, organizing, sorting and/or storing content. For example, the information sharing component 204 can organize content according to any number of different schemes including, but not limited, organization by type of content, organization by date of creation and/or modification, organization by author, and the like.

In some embodiments, the information sharing component 204 can sort content according to name of the content and/or date of creation, modification, storage at the communication device 200 and/or access. As shown in FIG. 7C, audio files 746, 748, 750, for example, can be sorted by the information sharing component 204 (or the information sharing component can transmit a signal to the UI component 202 controlling the UI to display the audio files) according to a date 742 associated with the audio file. Similarly, the files (or any other content) can be sorted and/or organized, stored or displayed based on the name 744 associated with the file (or content) or based on any number of other features of the content accessible by the information sharing component.

Referring back to FIG. 2, in various embodiments, although not shown, the information sharing component 204 can also enable an electronic invitation (or e-vite) to be transmitted to one or more recipients. The e-vite can include content including, but not limited to, website information (e.g., a URL, website), links, geographical information such as maps corresponding to the location of the event for which the electronic invitation is transmitted.

In various embodiments, the communication device 200 can include a global positioning system (GPS) receiver (not shown) for receiving GPS information indicating the location of the communication device 200, and the information sharing component 204 can be configured to receive the location information processed by GPS receiver and/or generate, download or otherwise retrieve maps and links corresponding to the location information. The maps and/or links can be shared from the communication device 200 via text message.

The electronic invitation can be sent via MMS and can have different text or content for one or more recipients or the same for multiple recipients. Accordingly, the content can be tailored to the needs of the recipient. As such, recipients that require assistance with locating the location of an event can receive a map attached to an e-vite for the event. As another example, a guest of honor for a surprise birthday party can receive a dinner invitation while attendees of the surprise birthday party can receive details indicating that the dinner is a surprise birthday celebration.

As shown in FIGS. 7A, 7B, 7C and 7D, the information sharing component 204 can enable a text message to be composed for dissemination utilizing such organization protocols discussed above.

Figure 7A:
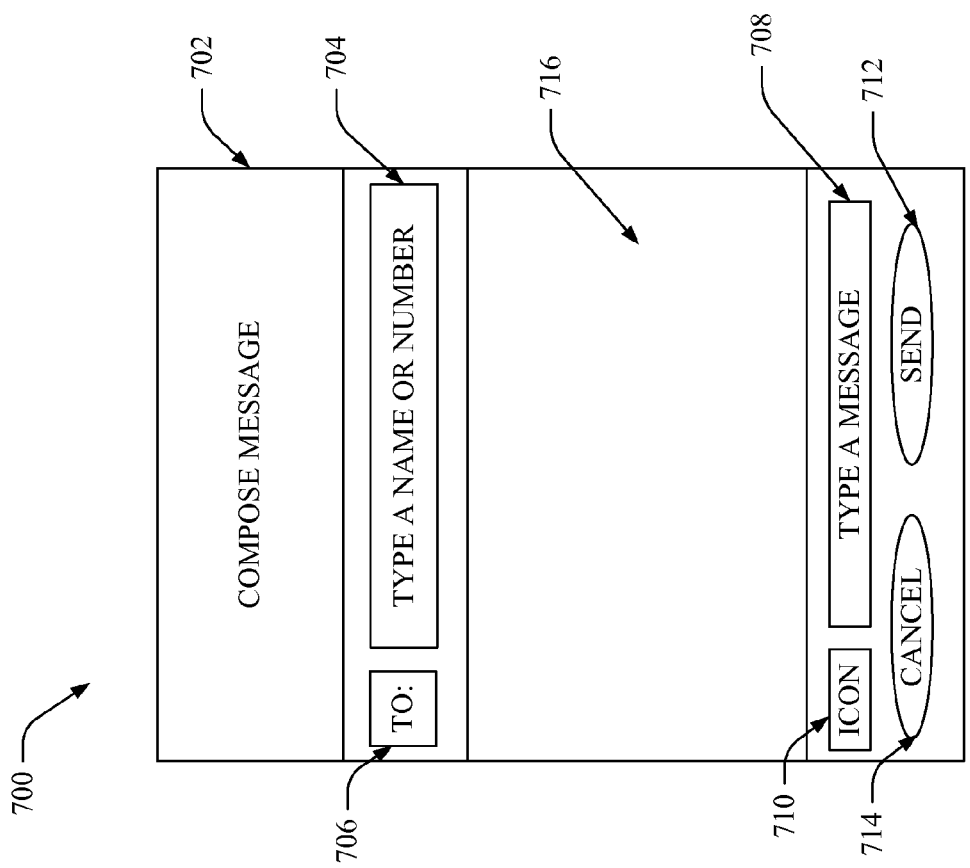
Figure 7C:
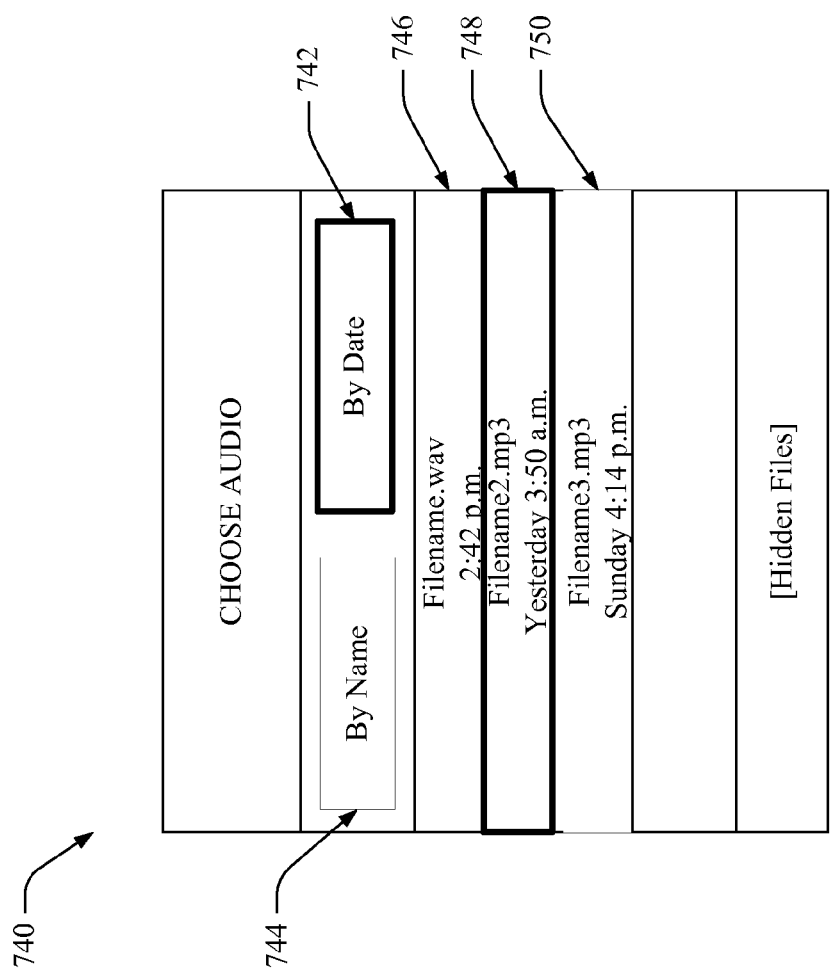

As shown in FIG. 7A, the information sharing component 204 can receive a signal for creating a text message shell. The text message shell can be created as shown at display region 700 in some embodiments. The display region 700 can include a top chrome 702 indicating that a text message is being composed, a text box 704 for receiving the name or telephone number associated with the intended one or more recipients of the text message, an icon 706 indicating the recipient information is to be provided in the text box 704, a text box 708 for receiving a message to be sent in the text message, an icon 710 indicating that a message is to be provided in the text box 708 and a region 716 for displaying the content (or indicia of the content) to be attached to the text message. In some embodiments, the display region 700 can also include a bottom chrome having button or icon 914 to cancel the text message and/or a button or icon 712 for sending the text message.

Now turning to FIG. 7B, the information sharing component 204 can provide retrieval of a type of content that has been selected for attachment to the text message. The information sharing component 204 can provide a signal to the UI component 202 to control the UI to display the menu of content types as shown in FIG. 7B. The menu can provide a host of content types that can be attached to a text message or an electronic invitation. The UI can receive inputs selecting one or more different types of content in any number of ways that inputs can be received at the UI, as explained above with reference to UI component 202 and the UI.

The communication device 200 can receive a signal indicating the selection of the type of the content. The signal can be generated and received by the information sharing component 204 in some embodiments. As shown in the display region 720 of the UI for the communication device 200, content such as media content 722, music content 724, location content 726, website content 728, and/or contacts content 730 can be retrieved and/or accessed by the information sharing component 204 for attachment to the text message. In various embodiments, one or more of the same or different types of content can be selected for attachment to the same text message.

In various embodiments, the information sharing component 204 can provide a central component from which numerous different types of content can be selected for attachment to a text message (or to an e-vite transmitted via MMS or SMS, as also described herein). In various embodiments, the information sharing component 204 can be communicatively coupled to repositories of content: stored on the communication device 200, provided in cloud storage (e.g., content in online locker/cloud storage), and/or accessible over the internet from repositories remote from the communication device 200 (e.g., content stored on social networking sites or websites).

In some embodiments, although not shown, the information sharing component 204 can be communicatively coupled to a media picker (not shown) configured to select the specific audio, video or image file of interest, a URL picker (not shown) configured to select a URL or website title or website information, a location picker (not show) configured to select location information for the communication device 200 and/or an event of interest (as dictated by a street address provided to the location picker) and/or a contacts application (not shown) configured to select contacts information. In some embodiments, the contacts application can be executed by the contacts component 214.

Referring back to FIG. 7B, for purposes of illustration, the music content 724 type is selected. As shown in FIG. 7C, after the information sharing component 204 receives a signal indicating a selected type of content for attachment to the text message, the information sharing component 204 can provide access to the files associated with the selected type of content. In this embodiment, the information sharing component 204 can retrieve audio files for selection as content to attach to the text message. Further, the information sharing component 204 can sort or organize the audio files according to name, date of creation, modification or access, type of music or any number of other ways to organize and sort data. As shown, the audio files in FIG. 7C are sorted by date.

As also shown with reference to FIG. 7C, the information sharing component 204 can enforce digital rights management (DRM) rules and policies and deny selection of audio files or other content that is not permitted to be disseminated. In various other embodiments, the information sharing component 204 can evaluate the DRM policies and rules associated with a particular content (whether the content be audio, video, images or otherwise) and deny dissemination altogether, deny attachment to the text message, deny dissemination to users after the content has been disseminated to a maximum number of users allowed under the DRM policy or rule for the content or the like. As such, the information sharing component 204 can deny the dissemination of content in text messages if it is illegal to transmit the content. In some embodiments, although not shown, the communication device 200 can include a DRM component configured to determine rules and policies for content. The DRM component can be communicatively coupled to the information sharing component 204 and can provide the policy and rule information to the information sharing component 204 and/or send information to the information sharing component 204 indicating whether dissemination of the content is allowed or disallowed and/or allowed or disallowed with limitations in transmission, recipients or in any other manner.

As shown in FIG. 7C, the information sharing component 204 can cause particular audio files (or any other particular content) to be unavailable for dissemination. As discussed above, the content could be unavailable for dissemination based on a determination by the information sharing component 204 that dissemination would violate the DRM rules or policies associated with the content, because a user has previously indicated that the files are private or unavailable for dissemination, because the information sharing component 204 has been programmed with rules and policies that forbid transmission of certain types of content (e.g., a parent of a user of the communication device 200 can program the communication device 200 such that the information sharing component 204 denies the transmission of certain types of files or images for the privacy and/or safety, for example, of the user of the communication device 200).

In some embodiments, the information sharing component 204 can be configured to evaluate images and deny transmission of particular images that have a high likelihood of being illegal for transmission over regulated wireless communication channels. In some embodiments, the information sharing component 204 can be programmed to deny attachment of certain types of content altogether. For example, the information sharing component 204 can be programmed to deny attachment of location information. The user or a parent of a user can deny any attachment of such information for the privacy and/or safety of the user, for example. As such, the information sharing component 204 will deny attaching location information about the current location of the communication device 200. In these embodiments in which certain files are unable to be disseminated and/or attached to a text message, the UI can hide the files or content from view by the user so as to limit the likelihood that the user will attempt to select the content for attachment to the text message.

Although not shown, in some embodiments, the information sharing component 204 can be configured to evaluate attachments of text messages and/or e-vites received at the communication device 200. The evaluation can be performed prior to launching an application to display or output the content (or, in the case of the content being a URL or website information, prior to browsing to the corresponding website). As with information dissemination, the information sharing component 204 can enforce DRM rights for content received from sending communication devices that cannot have turned on DRM enforcement in the information sharing component of the sending communication devices. The information sharing component can deny opening the content if doing so evaluates the DRM rules or policies associated with the content.

In various embodiments, the information sharing component 204 can include filters configured to evaluate the received content, and deny opening content for which opening violates rules or policies with which the information sharing component 204 at the communication device 200 has been programmed. By way of example, but not limited, the information sharing component 204 can prevent opening particular images or audio files received at the communication device 200.

Figure 7D:
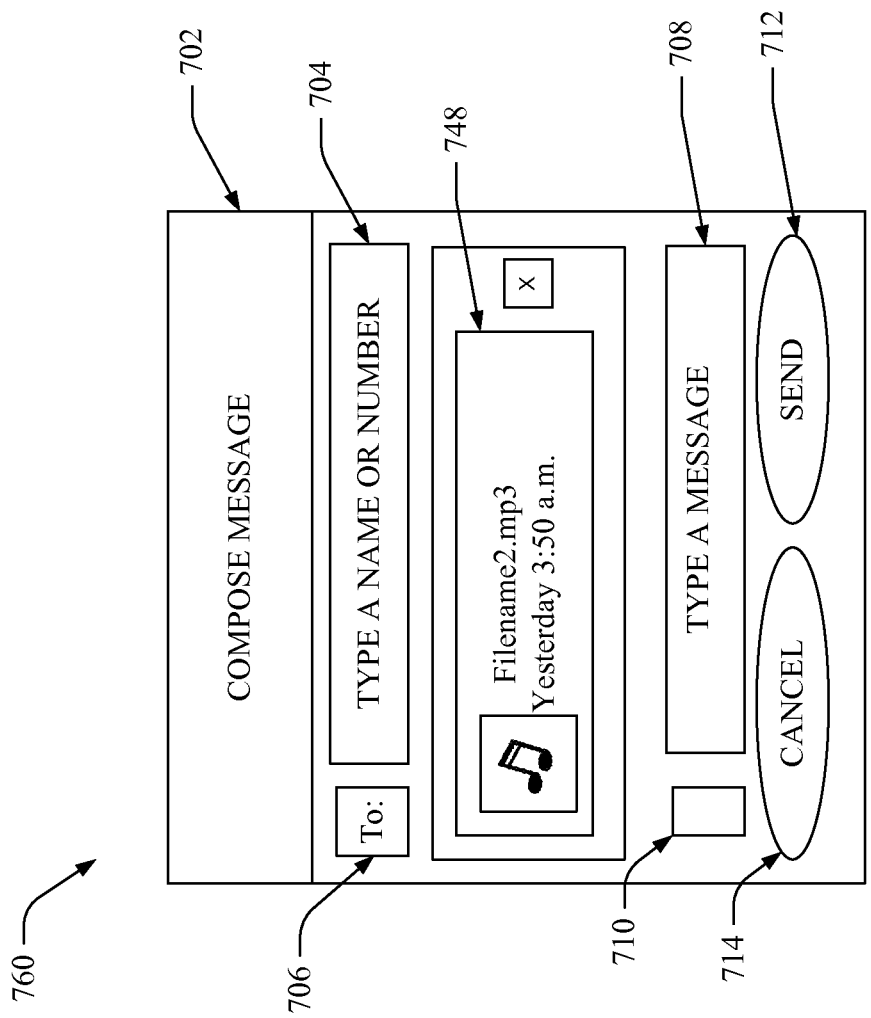

Referring to FIG. 7D, if the audio file selected as shown in FIG. 7C can be disseminated, the information sharing component 204 can attach the audio file 748 to the body portion of the text message. Upon activating the send button or icon 712, and providing recipient information at 704, the information sharing component 204 can transmit the text message, which now includes the audio file, to one or more recipients.

Figure 8B:
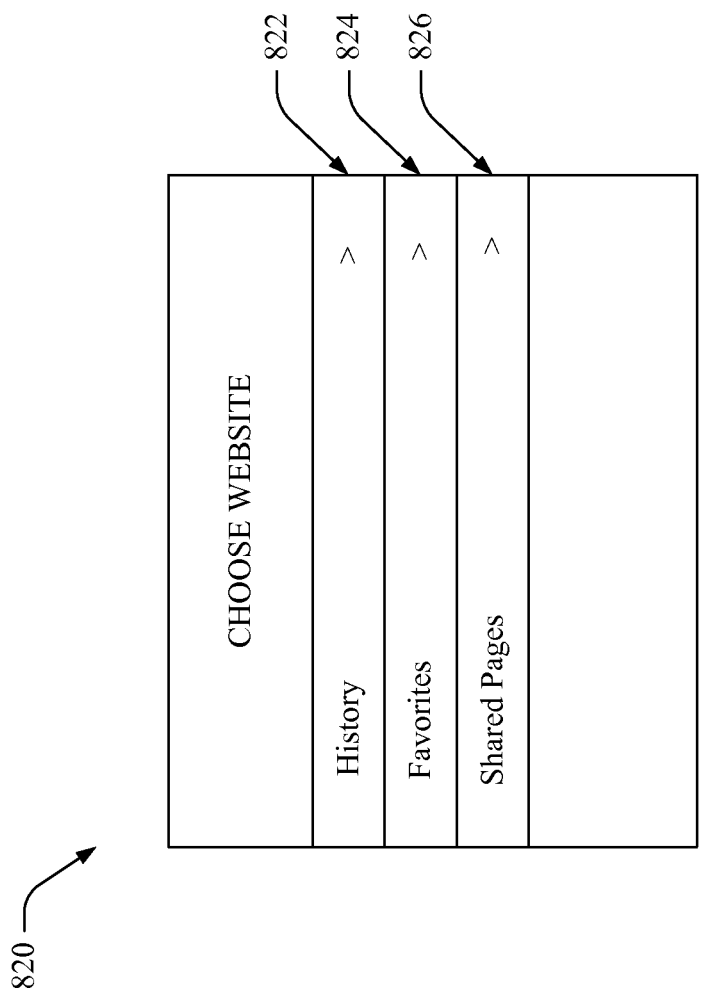

FIGS. 8A, 8B, 8C, 8D, 8E and 8F are other display regions illustrating various functionality of the information sharing component 204 for composing a text message including content. As shown in FIG. 8A, a text message shell can be generated. The text message shell can be generated in the form shown at display region 800. In some embodiments, one or more of the features of the display region 800 can be as follows.

The top chrome 802 can indicate that a message is in the process of being composed. A text box 804 can be provided for receiving a name or telephone number or other identifier of a recipient can be provided. An icon 806 can be provided indicating that recipient information should be provided at text box 804. A display region 816 can be provided for displaying content attached to the text message can be provided. Text for the text message can be provided at a text box 808 and an icon 810 can indicate such. At 814 and 812, cancel and send buttons or icons are provided for cancelling the text message and transmitting the message to the recipients, respectively.

As shown at FIG. 8B, the UI can transition to a screen showing a display region 820 enabling a user to select content for display region 816. As shown in FIG. 8B, indicators of the content can be organized by history 822, favorites 824 (or whether the user has indicated preferences for the content), and/or whether the content has been shared 826. In the display region 820, content is organized for websites (for attaching URLs to the text message). Although other types of content described herein can also be organized in these or other more relevant folders or categories.

Figure 8C:
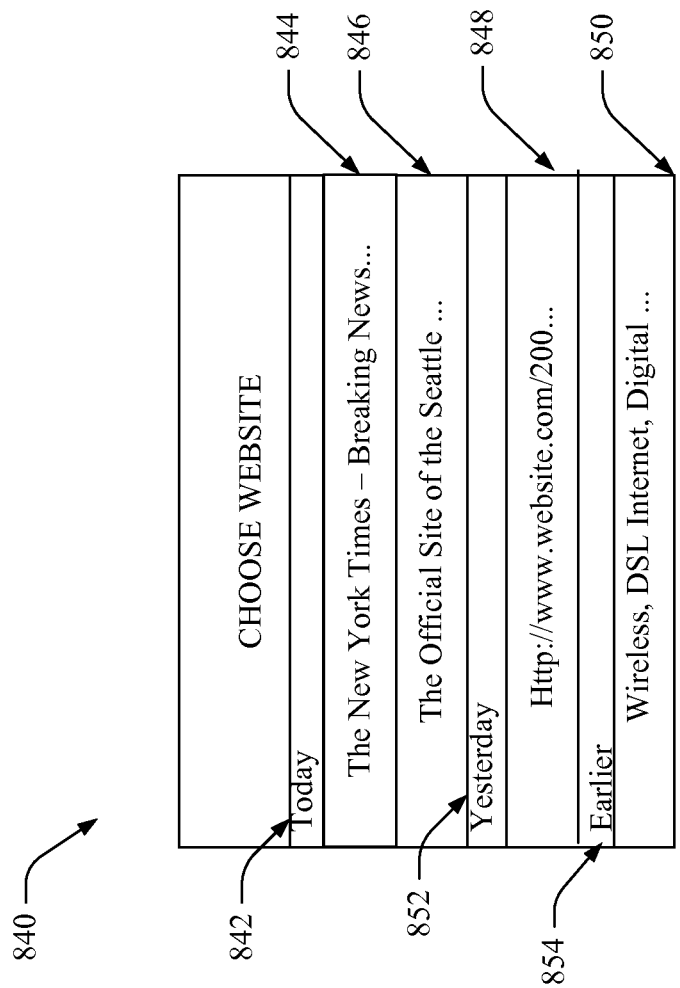

At FIG. 8C, another method of organizing content and displaying an indicator of the content is shown (and provided for user selection of content). As described below in greater detail, the content can be organized and an indicator of the content can be displayed based on a date associated with the content. Again, while website information is shown, other content can be organized by date (as shown with reference to the audio content displayed in FIG. 7C, for example).

Figure 8D:
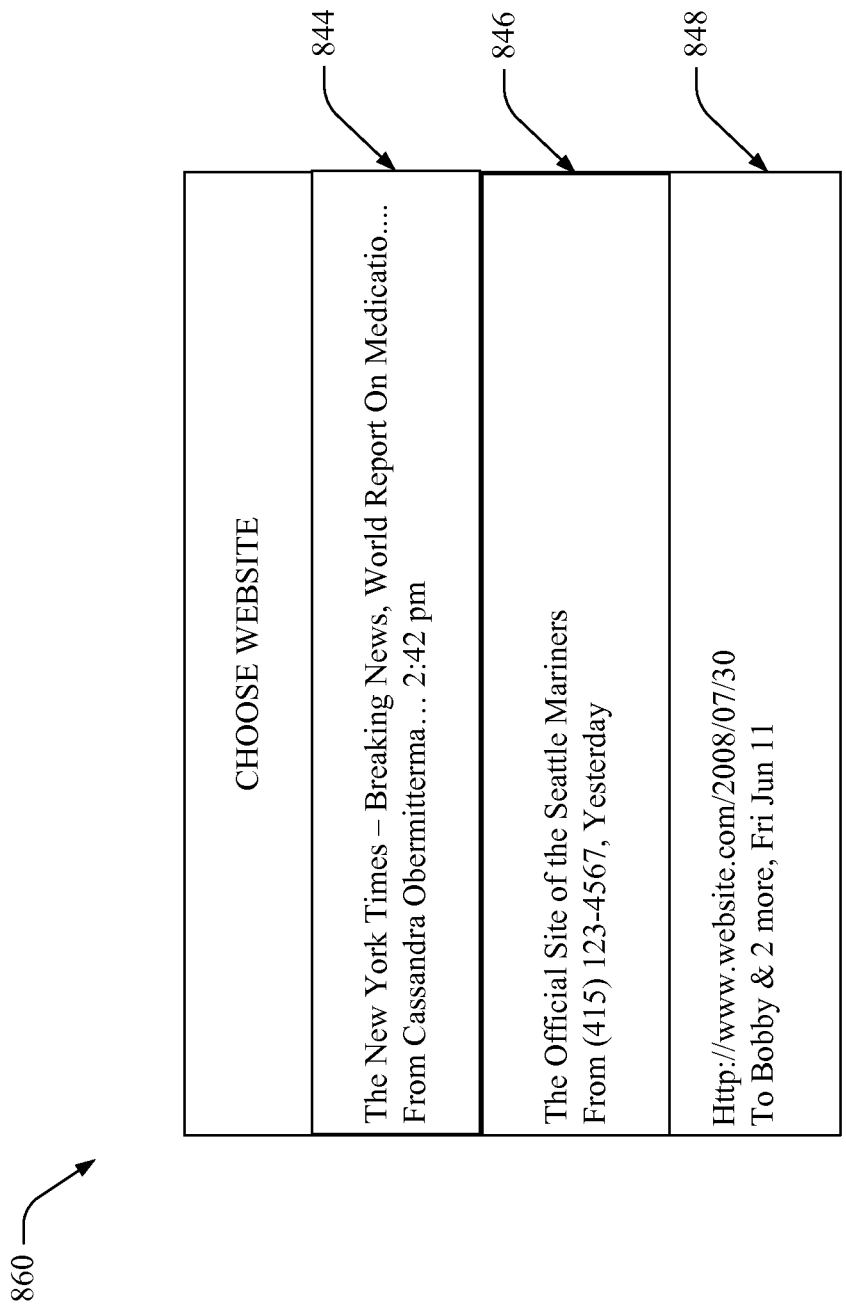

At FIG. 8D, another method of displaying an indicator of the content is shown. An indicator of the content can be displayed along with contacts information associated with the content. As shown, for example, titles or URLs for websites can be displayed along with an author or sender of the content (as shown at 844), along with the telephone number and date of receipt or generation or modification of the content (as shown at 846) or along with the recipients to which the content has been previously sent and the date of transmission to the recipients (as shown at 848).

At FIG. 8E, as described below in greater detail, displaying an indicator of the content in association with folders into which the content is stored can be provided.

Figure 8E:
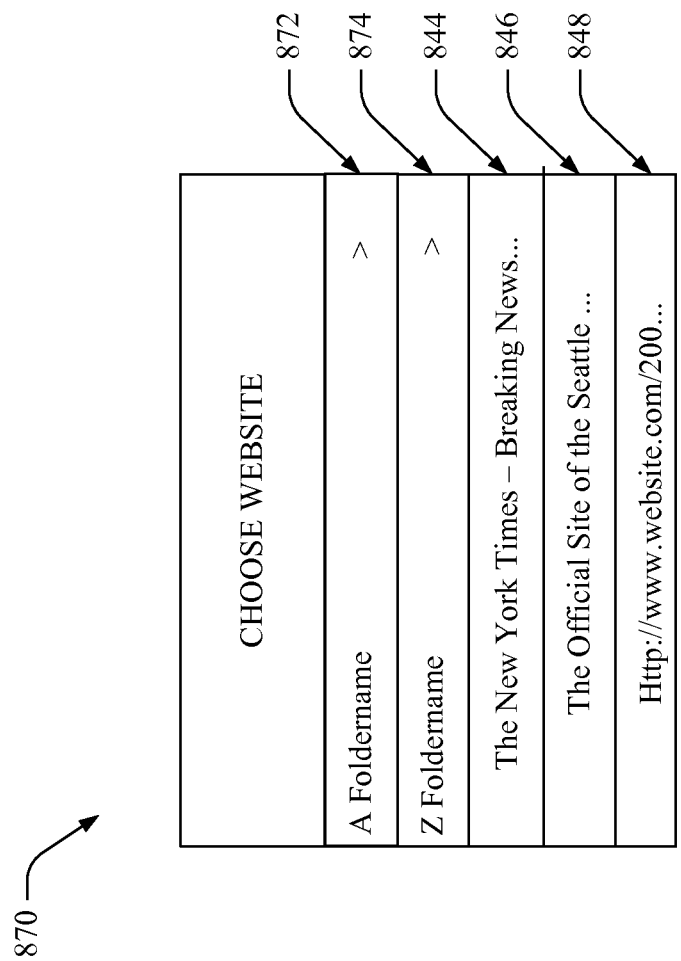
Figure 8F:
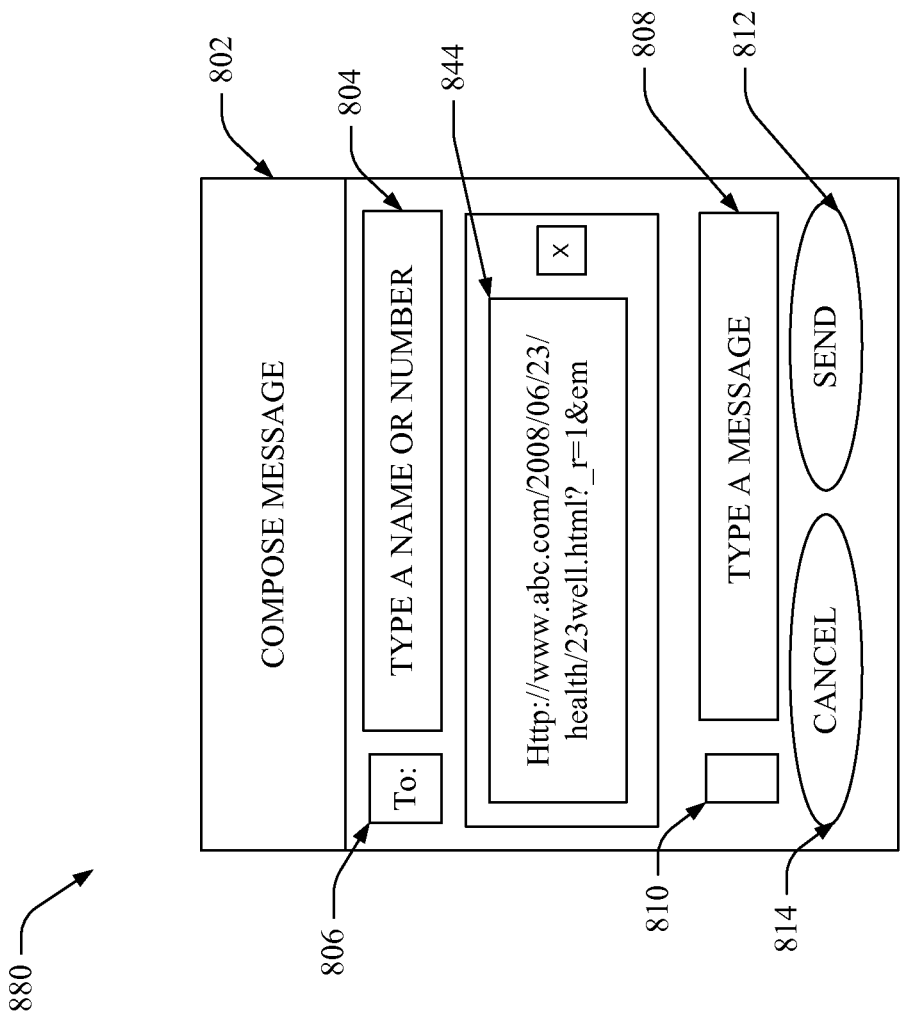

At FIG. 8F, upon selection of content, the content (in this case, a URL) 844 can be provided in the text messaging shell shown at display region 880. The text message can be created and transmitted with the content.

Composition of text messages can be facilitated by categorization of the content by the information sharing component 204.

In particular, in some embodiments, the information sharing component 204 can categorize and/or store content in folders or other repositories for ease of location as shown in FIGS. 8B, 8C and 8E. By way of example, but not limitation, as shown with reference to the display region 800 of FIG. 8B, website information (e.g., URLs, information indicative of URLs, websites, or indicia or titles of websites) can be stored in folders according to the history 822 of access of the URLs and corresponding websites, according to whether the website associated with the URL is a favorite 824 and/or according to whether the website has been shared/disseminated 826 previously from the communication device.

By way of another example, but again, not by limitation, as shown with reference to display region 840 of FIG. 8C, website information can be organized by date. As shown, website information 844, 846 associated with today's date 842 (e.g., updated today) can be associated with a folder indicating today's date or otherwise organized together and associated with today's date. As shown, the display region 840 can display website information associated with today's date by listing the URLs, or indicia or titles of websites, under a heading titled "Today". Similarly, headings 852, 854 can relate to other dates or periods of time, and corresponding website information created or updated or otherwise associated with those periods of time can be organized and/or displayed in association with those periods of time.

As shown in FIG. 8E, the website information can be stored in folders created by the user of the communication device 200. The information sharing component 204 can receive signals input from the UI component 202 for creating, naming, deleting customized folders and/or associating content with, or storing content in, such folders. As shown, folders 872, 874 are customized folders created by a user and named according to the name desired by the user (and therefore likely to be able to be easily recalled by the user). In Z Foldername 874, the information sharing component 204 has stored website information 844, 846, 848. As such, the information sharing component 204 can retrieve a signal indicating a desire to attach website information from Z Foldername 874 and the website information 844, 846, 848 can be accessible from such folder.

While the above examples provide detailed steps regarding attaching audio and website information to a text message, in various embodiments, location information, including maps, links to physical locations, GPS coordinates and/or satellite images at a location of the communication device 200 can be attached to a text message. Other content that can be attached to the text message can include, but is not limited to, video, images, contact information or the like. In various embodiments, different types of content can be attached to a single text message.

In some embodiments, the information sharing component 204 can facilitate retrieval and storage of the content from or to different locations. Exemplary content destinations can include, but are not limited to, an online storage locker, a folder on a communication device coupled to the communication device 200, and/or a social networking site.

As such, organization of content by the information sharing component 204 can improve the user experience and enable the user to quickly and easily obtain content for attachment to text messages. Ease of use can further enforce the preference for text messaging over email messaging.

While the above embodiments primarily describe dissemination of text messages with content, the information sharing component 204 can also be configured to receive text messages with content and/or to access the received content. By way of example, but not limitation, the information sharing component 204 can be configured to receive and process the content. Upon activation of a URL in a text message, the communication device 200 can access a browser (not shown) included with the communication device 200. For example, the browser can be an OPERA® web browser in various embodiments. The UI can display the webpage associated with the URL attached to the text message. In other embodiments, upon activating a region of the display region that corresponds to a symbol indicating the attached media, the UI can display the attached media.

Referring back to the communication device 200 of FIG. 2, the communication device 200 can include a data store component 210. The data store component 210 can include hardware, software and/or a combination of hardware and software to store content for use by the information sharing component 204 in creating text messages with content. In some embodiments, the content, or information about the content, can be stored in the data store component 210 of the communication device 200. For example, URL information can be associated with a picture, audio file or other content, and accessed to determine the location of the content. In other embodiments, text message (e.g., MMS, SMS) attachment protocols for attaching the content to the text messages can also be stored in the data store component 210. In some embodiments, video can be overlayed with multi-track audio, images can be cropped, re-sized and other manipulations typically allowed for images.

The communication device 200 (or the information sharing component 204) can also include a messaging component (not shown) configured to control the operation of one or more messaging applications. By way of example, but not limitation, messaging applications can include those associated with short message service (SMS), multimedia message service (MMS), instant messaging and the like. Generally, messaging applications can include applications that are text-based, voice-based, video-based and/or combination voice and audio-based applications such as text messaging, instant messaging, internet and landline telephony, and/or audio and textual voicemail communications.

The messaging component 212 can be configured to receive inputs from the I/O component 220 and format, transmit and/or receive messaging content in response to the inputs received. The messaging content can be text messages in various embodiments, such as MMS and/or SMS messages. The MMS messages can include various different types of content. Specifically, the information sharing component 204 can receive a signal indicating that a particular type of content is selected for attachment to a text message. The information sharing component 204 can access the content via the data store component 210 (if the content is stored on the communication device 200) or via the internet (e.g., if the content is a website or located on a social networking site).

In some embodiments, the messaging component 212 can facilitate generation and maintenance of conversations stored on or accessible by the communication device. A conversation can include one or more messages to and from an entity. In various embodiments, an entity can be one or more natural or legal persons or organizations. As described herein, the messages can be text messages. Each of the one or more messages can include text and/or content attached to the messages as described herein.

The communication device 200 can also include a memory 208. The memory 208 and/or data store component 210 can store information and/or settings and/or computer-executable instructions for performing one or more functions described herein for the communication device 200. In various embodiments, the data store component 210 that can store data structures (e.g., user data, application data, metadata); code structure(s) (e.g., modules, objects, classes, procedures) or instructions; message hashes; neighbor cell list; information relating to securing the communication device 200 and information associated therewith, displaying information in the UI display screen, generating or displaying an overlay display region, generating or processing notifications and associated notification-related information; network or device information like policies and specifications; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 206 can be functionally coupled (e.g., through a memory bus) to the data store component 210 in order to store and retrieve information (e.g., neighbor cell list; information relating to securing the communication device 200 and information associated therewith, displaying information in the UI display screen, generating or displaying an overlay display region, generating or processing notifications and associated notification-related information; frequency offsets; desired algorithms; etc.) desired to operate and/or confer functionality, at least in part, to, information sharing component 204, UI component 202 and/or substantially any other operational aspects or components of the communication device 200.

The communication device 200 can also include a contacts component 214 configured to control the operation of one or more contact applications. The contact applications can provide and/or enable display, deletion or editing contacts information. The contact applications can provide and/or enable display, deletion or editing contacts information. By way of example, but not limitation, contacts information can include the profile photos, associated avatars for the contacts, email addresses, mobile, home, work and/or fax telephone numbers for contacts, physical street addresses, social network identification information, social network identification, voice information, geographical contact information, biographical information such as the birthday or date of incorporation of the contacts, and/or preferences such as favorite foods, and the like.

In various embodiments, the contacts application can be accessed by the information sharing component 204 during creation of a text message. The contacts application can be accessed to retrieve and/or automatically insert a telephone number or name for a contact to which the text message is intended to be sent. In some embodiments, multiple telephone numbers can be indicated as recipients of a text message.

In some embodiments, contacts information can be content attached to the text message. By way of example, but not limitation, a contacts vCard can be attached to a text message. The vCard can be the vCard for the composer of the text message or a vCard for a contact stored on or accessible by the communication device 200.

In various embodiments, other contacts information for the user of the communication device 200 or for a contact stored on or accessible by the communication device 200 can be attached to a text message. By way of example, but not limitation, the user of the communication device 200 can draft a text message and attach contact information for a business colleague providing a service of interest. The information sharing component 204 can facilitate creation of such message and dissemination to a third-party having an interest in obtaining such service.

The recipients can receive the same text message (including the same content attached to the text message in some embodiments). In some embodiments, one or more recipients can receive different content with the same text, same content with different text, as dictated by the user of the communication device 200 when the text messages to be disseminated are created.

The communication device 200 can also include a social media component 216 configured to control the receipt, aggregation, generation, output and/or filtering of social median information at the communication device 200. By way of example, but not limitation, social median information can include, but is not limited to, information associated with or output from social media feeds, blog information, chat information, instant messaging information, and the like. The social median information can be displayed in any number of arrangements including, but not limited to, the subject matter of the social media feed, the social networking site from which the social media feed is provided and/or the chronological order of the social media feeds. In some embodiments, the social median information can include comments posted (or a number of comments posted) in association with one or more social media feeds for the individual. In some embodiments, one or more comments can be shown on the UI with the one or more feeds. The social media applications can include applications that provide social media feeds, news feeds and wall postings from FACEBOOK®, activity updates (e.g., tweets) from TWITTER® or other information from social networking sites such as MYSPACE®, websites of interest and the like.

In various embodiments, the social media component 216 can be communicatively coupled to the information sharing component 204 to enable the information sharing component 204 to retrieve the social median information and attach the social median information to a text message. The social median information can be information for the user of the communication device 200 or for any entity for which the social media component 216 can receive social median information. For example, the social median information can be a wall post or status update or photo associated with a FACEBOOK® site friend of the user of the communication device 200. As such, the information sharing component 204 can enable the dissemination of text messages including social media content.

In various embodiments as described herein and with reference to any number of different applications including, but not limited to, a messaging application, a contacts application and/or a social media application, where an entity, person or individual is discussed, the entity, person or individual can be a legal or natural entity, person or individual. Similarly, in various embodiments as described herein and with reference to any number of different applications including, but not limited to, a messaging application, a contacts application and/or a social media application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

The communication device 200 can also include an application integration component (AIC) (not shown). In some embodiments, the AIC can include software and/or hardware configured to integrate one or more applications at an individual level or at a group level. Integrating one or more applications at an individual level can include retrieving and/or providing information specific to an individual. Integrating one or more applications at a group-level can include retrieving and/or providing information specific to a group or individuals of, or members of, the group. For example, the AIC can provide messaging, contacts and/or social median information about a specific individual or for a specific group or for specific members of a group.

In these embodiments, the AIC can enable the communication device 200 to be individual-targeted or group-targeted in provisioning of contact, messaging and/or social median information without requiring a user of the apparatus to enter individual applications for each of the contact, messaging and/or social median information.

As such, while the messaging component 212, contacts component 214 and the social media component 216 can allow the user of the communication device 200 to display (or the information sharing component 204 to transmit) messaging, contacts and social median information about one or more individuals or groups on a single display region of the UI, when the AIC integrates the messaging, contacts and/or social media application, the AIC can do such integration at an individual or group level. As such, upon integration, the messaging, contacts and/or social median information can be targeted towards a single individual and/or a single group. The targeted information can be information that displays details specific to or about the individual and/or group. Such targeted information can be displayed by UI.

The communication device 200 also can include a processor 206. The processor 206 can enable the communication device 200 to process data relating to dissemination of information from the communication device 200 and information associated therewith, displaying information on the UI, generating or displaying an overlay display region, generating or processing notifications, associated notification-related information, composing MMS and/or SMS text messages, retrieving content for text messages including, but not limited to, URLs, location information, maps, links, photos, audio files, video files. In some embodiments, the processor 206 can be configured to execute computer-executable instructions to perform one or more of the functions described herein for the communication device 200 and/or the information sharing component 204 and the memory 208 can store the computer-executable instructions and/or information for performing the operations described herein.

In various embodiments, the processor 206 can be configured to confer functionality, at least in part, to substantially any component within the communication device 200, in accordance with aspects of the subject innovation. As another example, the processor 206 can facilitate enabling the communication device 200 to process data (e.g., symbols, bits, or chips) for multiplexing/demultiplexing, modulation/demodulation, such as implementing direct and inverse fast Fourier transforms, selection of modulation rates, selection of data packet formats, inter-packet times, and the like.

While the embodiments described herein are described with reference to a combination of two or more components, in various embodiments, one or more of the functions or structure (or part thereof) associated with the two or more components of the communication devices 102, 200 can be performed or provided in the information sharing component 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

Figure 3:
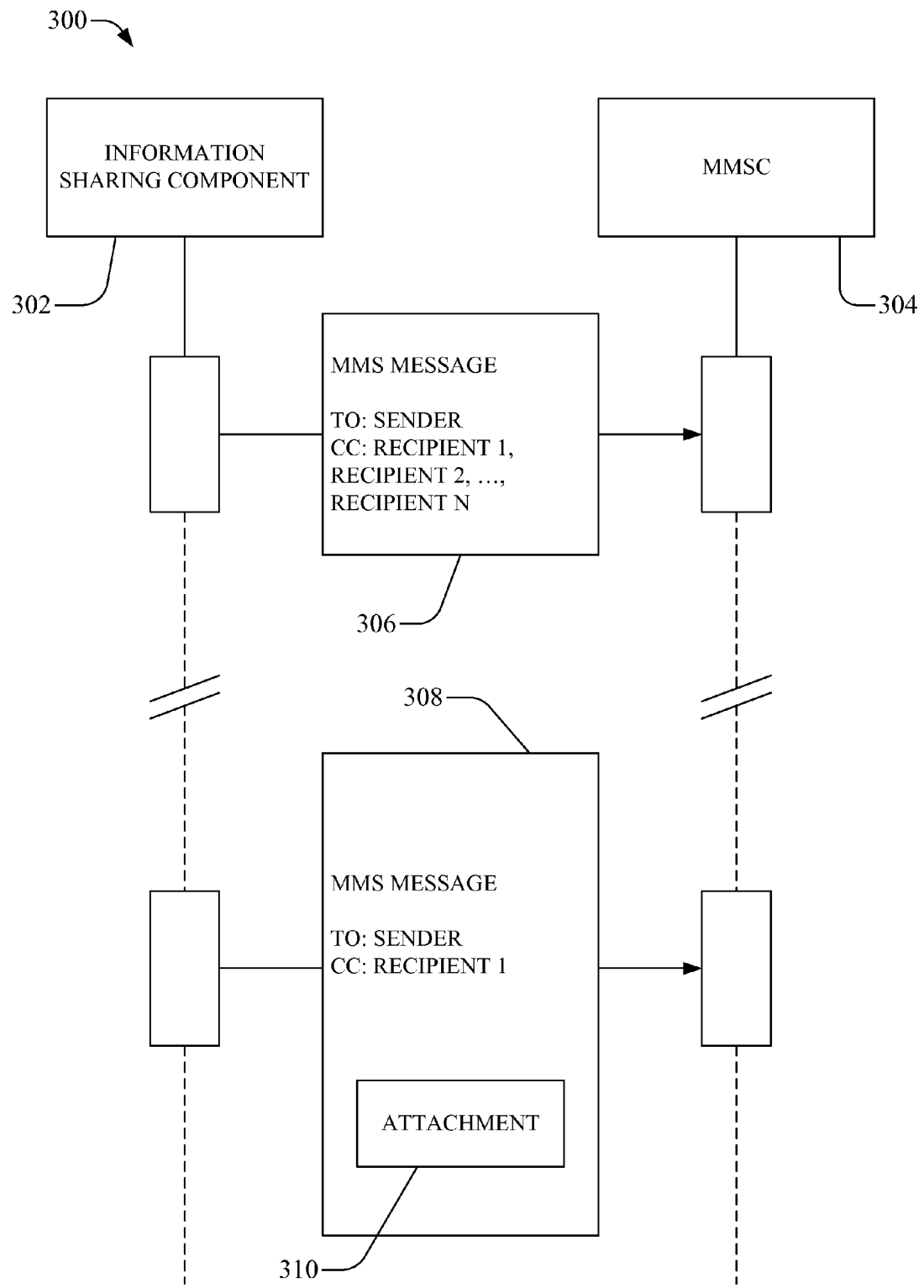
FIG. 3 illustrates a block diagram of an exemplary system that facilitates information sharing for communication devices in accordance with various aspects and embodiments described herein.

FIG. 3 illustrates a block diagram of an exemplary system that facilitates information sharing for communication devices in accordance with various aspects and embodiments described herein. The system 300 can include an information sharing component 302 and a telecommunication carrier's MMS stored and forward server (MMSC) 304. The telecommunication carrier can be the carrier associated with the communication device 200 of FIG. 2 and/or the communication devices 102, 104 of FIG. 1. The information sharing component 302 can be provided at the communication device and include one or more of the functions described herein with reference to information sharing component 204 and/or information sharing component 108. In particular, the information sharing component 302 can encode the text message 306, 308 and forward the MMS text message 306, 308 to the MMSC 304. In various embodiments, the text message 306, 308 can include an attachment of content 310, such as the content described herein that can be selected by a user of the communication device and attached to a text message. The MMSC can evaluate the text message 306, 308 and forward the text message 306, 308 on to the one or more recipients indicated in the text message. In the embodiment shown in FIG. 3, the text message 308 is transmitted to one recipient while text message 306 is transmitted to N recipients. While text message 306 is transmitted to numerous recipients, a single text message can be sent and all recipients can receive the single text message.

Figure 4:
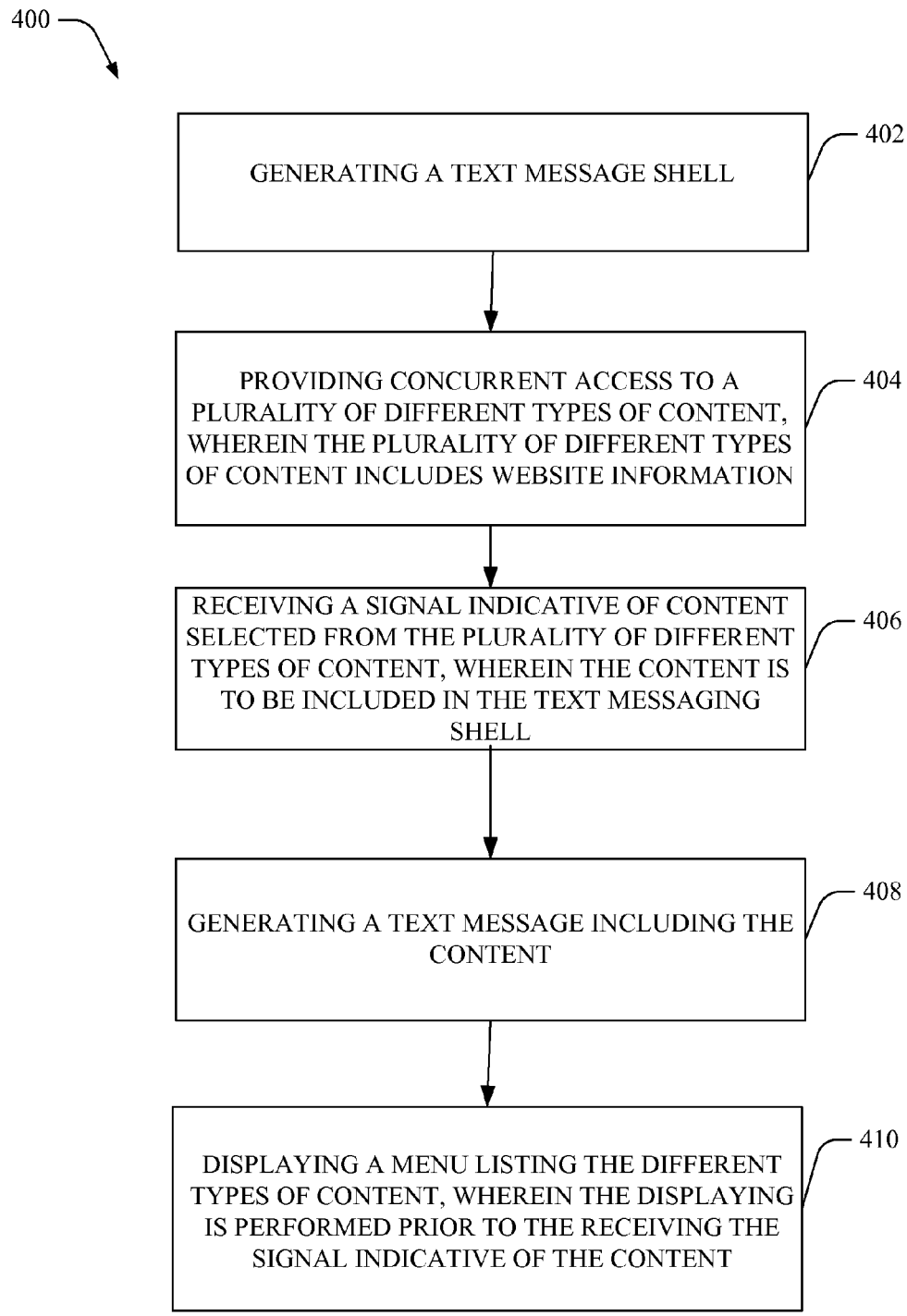
FIGS. 4, 5 and 6 illustrate exemplary flow diagrams of methods that facilitate information sharing for communication devices in accordance with aspects described herein.

FIG. 4 is a flowchart of a method for facilitating information sharing via a communication device. At 402, method 400 can include generating a text message shell. At 404, method 400 can include providing concurrent access to a plurality of different types of content, wherein the plurality of different types of content includes website information.

In some embodiments, providing concurrent access to the plurality of different types of content can comprise providing concurrent access to one or more of contacts information, media or geographical location information for the communication device, and the website information can comprise at least one of a uniform resource locator or website title. In some embodiments, the geographical location information for the communication device comprises at least one of: a map, a uniform resource locator for a website indicating the geographical location, global positioning service coordinate information, satellite images, street address information or a business name.

In some embodiments, providing concurrent access comprises providing concurrent access to one or more social networking sites and to at least one data store component stored on the communication device. For example, the data store component can be data store component 210 and/or the social networking sites can be accessed via the social media component 216.

At 406, method 400 can include receiving a signal indicative of content selected from the plurality of different types of content, wherein the content is to be included in the text messaging shell.

In some embodiments, prior to receiving the signal indicative of the selected content, receiving a signal indicative of a selected type of content, and displaying the content based, at least, on name of the content, date of creation of the content, whether the content has a preferred status or whether the content has been previously shared from the communication device.

At 408, method 400 can include generating a text message including the content. The text message can be an MMS or SMS message in various embodiments. In some embodiments, the text message can be an email message or an instant message.

At 410, method 400 can include displaying a menu listing the different types of content, wherein the displaying is performed prior to the receiving the signal indicative of the content.

In some embodiments, the method 400 can also include transmitting (not shown) different versions of the text message to different recipients, wherein the different versions of the text message include different selected content.

In some embodiments, method 400 can also include determining (not shown) whether digital rights management rules associated with the selected content allow dissemination of the selected content; and transmitting (not shown) the text message including the selected content based, at least, on determining that the digital rights management rules associated with the selected content allow dissemination of the selected content.

Figure 5:
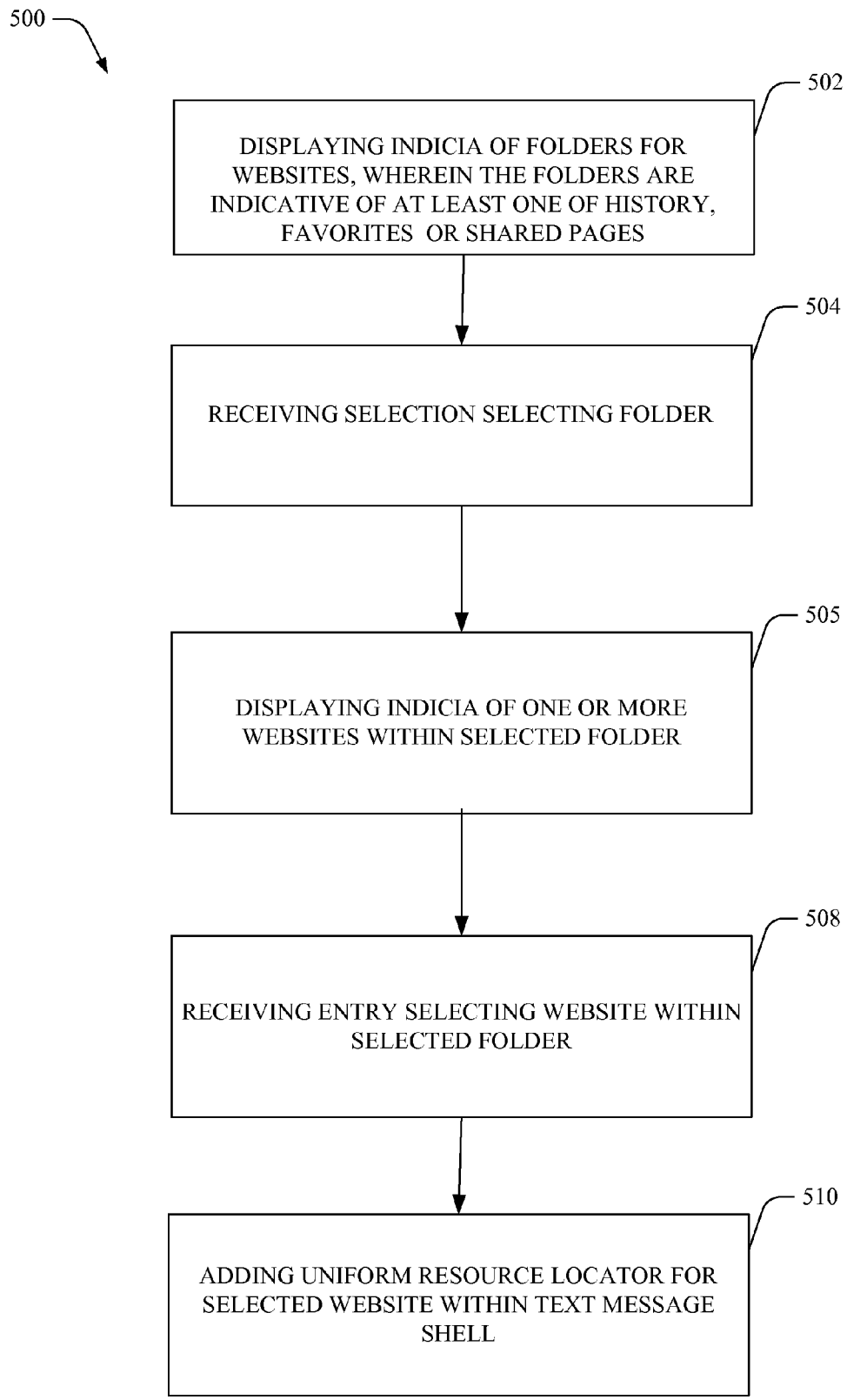

FIG. 5 is another flowchart of a method for facilitating information sharing via a communication device. At 502, method 500 can include displaying indicia of folders for websites. The folders can be indicative of at least one of history, favorites or previously shared pages. For example, the display region 840 of FIG. 8C can be indicative of the displaying of step 502.

At 504, method 500 can include receiving a selection selecting a folder. The selection can be received via the UI in various embodiments. At 506, method 500 can include displaying indicia of one or more websites within the selected folder. The indicia can include, but is not limited to, a title of a website (as shown at 846 of FIG. 8C), a URL associated with a website (as shown at 848 of FIG. 8C), keywords associated with website (as shown at 850 of FIG. 8C)

At 508, method 500 can include receiving an entry selecting a website within the selected folder. At 510, method 500 can include adding a URL for the selected website within a text message shell. As shown at FIG. 8F, the URL 844 can be added to the text message shell depicted as display region 880. Text can be added to the text messaging shell and the text message, including the URL content can be transmitted to one or more recipients.

While the embodiments described herein are described with reference to a combination of two or more components, in various embodiments, one or more of the functions or structure (or part thereof) associated with the two or more components of the communication devices 102, 200 can be performed or provided in the information sharing component 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

Figure 6:
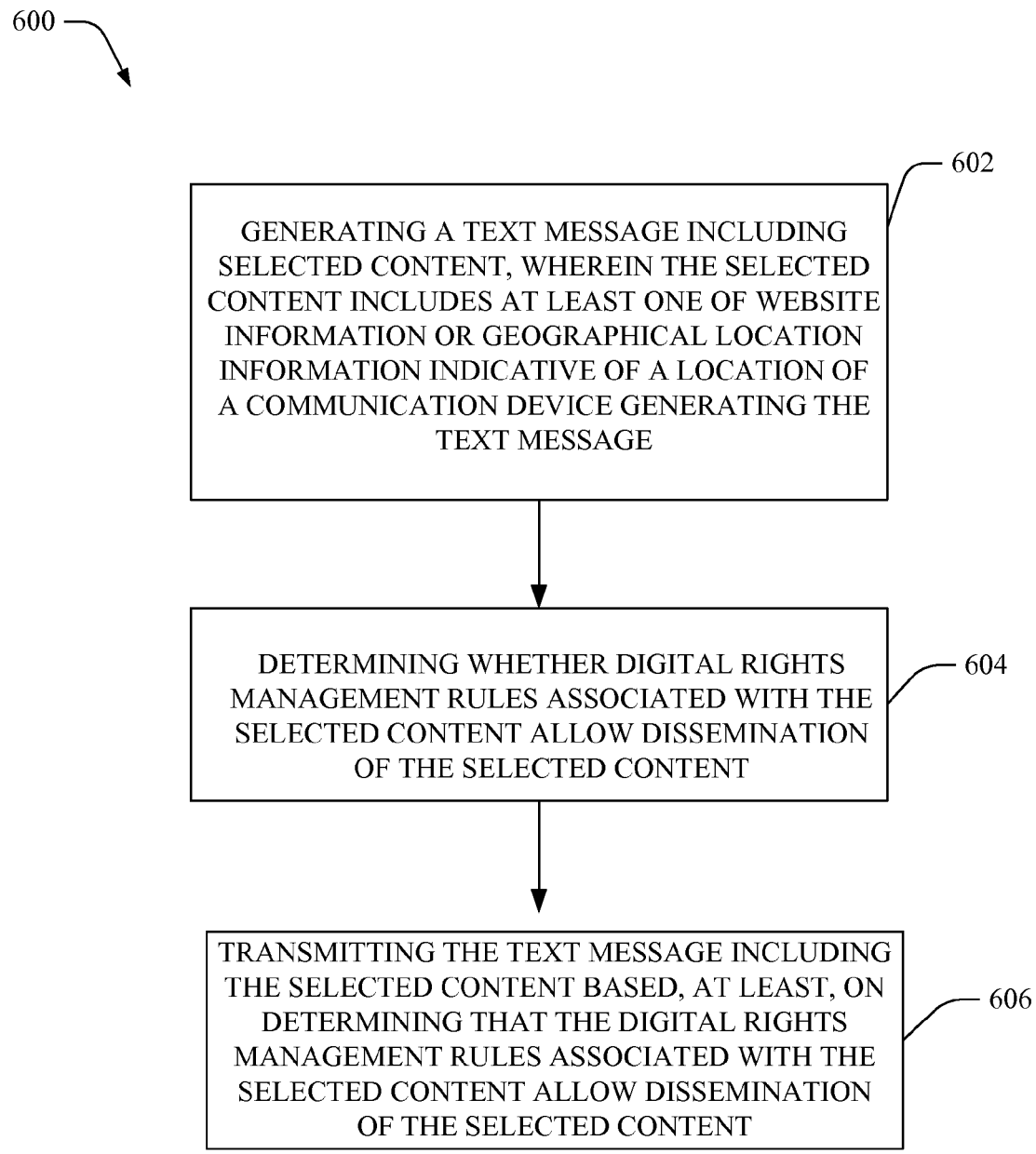

FIG. 6 is another flowchart of a method for facilitating information sharing via a communication device. At 602, method 600 can include generating a text message including selected content, wherein the selected content includes at least one of website information or geographical location information indicative of a location of a communication device generating the text message.

At 604, method 600 can include determining whether digital rights management rules associated with the selected content allow dissemination of the selected content.

At 606, method 600 can include transmitting the text message including the selected content based, at least, on determining that the digital rights management rules associated with the selected content allow dissemination of the selected content.

Figure 9:
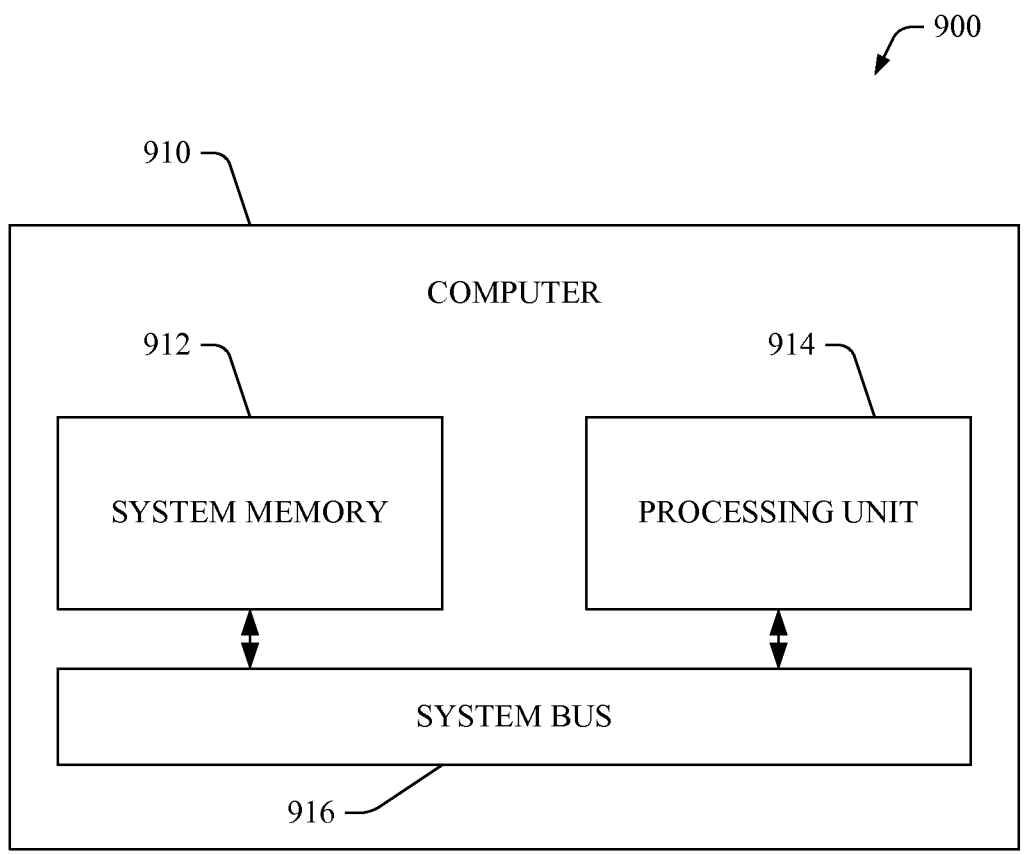
FIG. 9 illustrates an exemplary operating environment that facilitates the systems, apparatus, methods and computer-readable storage media described herein.

FIG. 9 illustrates an exemplary operating environment that facilitates the systems, apparatus and methods described herein. In order to provide additional context for various aspects of the embodiments described herein, FIG. 9 and the following discussion are intended to provide a brief, general description of a computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available media that can be accessed by a computing device and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media can embody computer-readable instructions, data structures, program modules and/or other structured or unstructured data in a data signal such as a modulated data signal, e.g., a carrier wave or other transport mechanism, and includes any information delivery or transport media. The term "modulated data signal" or "modulated data signals" refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media. Combinations of any of the above can also be included within the scope of communication media. In some embodiments, communication media are capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 900 for implementing various aspects includes a computer 910, the computer 910 including a processing unit 914, a system memory 912 and a system bus 916. The system bus 916 couples system components including, but not limited to, the system memory 912 to the processing unit 914. The processing unit 914 can be any of various commercially available processors, such a single core processor, a multi-core processor, or any other suitable arrangement of processors. The system bus 916 can be any of several types of bus structure that can further interconnect to a memory bus (with or without a memory controller), a peripheral bus, and a local bus using any of a variety of commercially available bus architectures. The system memory 912 can include ROM, random access memory RAM, high-speed RAM (such as static RAM), erasable programmable read only memory (EPROM), EEPROM, flash memory, and/or the like. Additionally or alternatively, the computer 902 can include a hard disk drive, upon which program instructions, data, and the like can be retained. Moreover, removable data storage can be associated with the computer 910. Hard disk drives, removable media, computer-readable storage media, etc. can be communicatively coupled to the processing unit 914 by way of the system bus 916.

The system memory 912 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 910 through one or more wired/wireless input devices, such as a keyboard, pointing and clicking mechanism, pressure sensitive screen, microphone, joystick, stylus pen, etc. A monitor or other type of interface can also be connected to the system bus 916.

The computer 910 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 910 can connect to other devices/networks by way of antenna, port, network interface adaptor, wireless access point, modem, and/or the like.

The computer 910 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
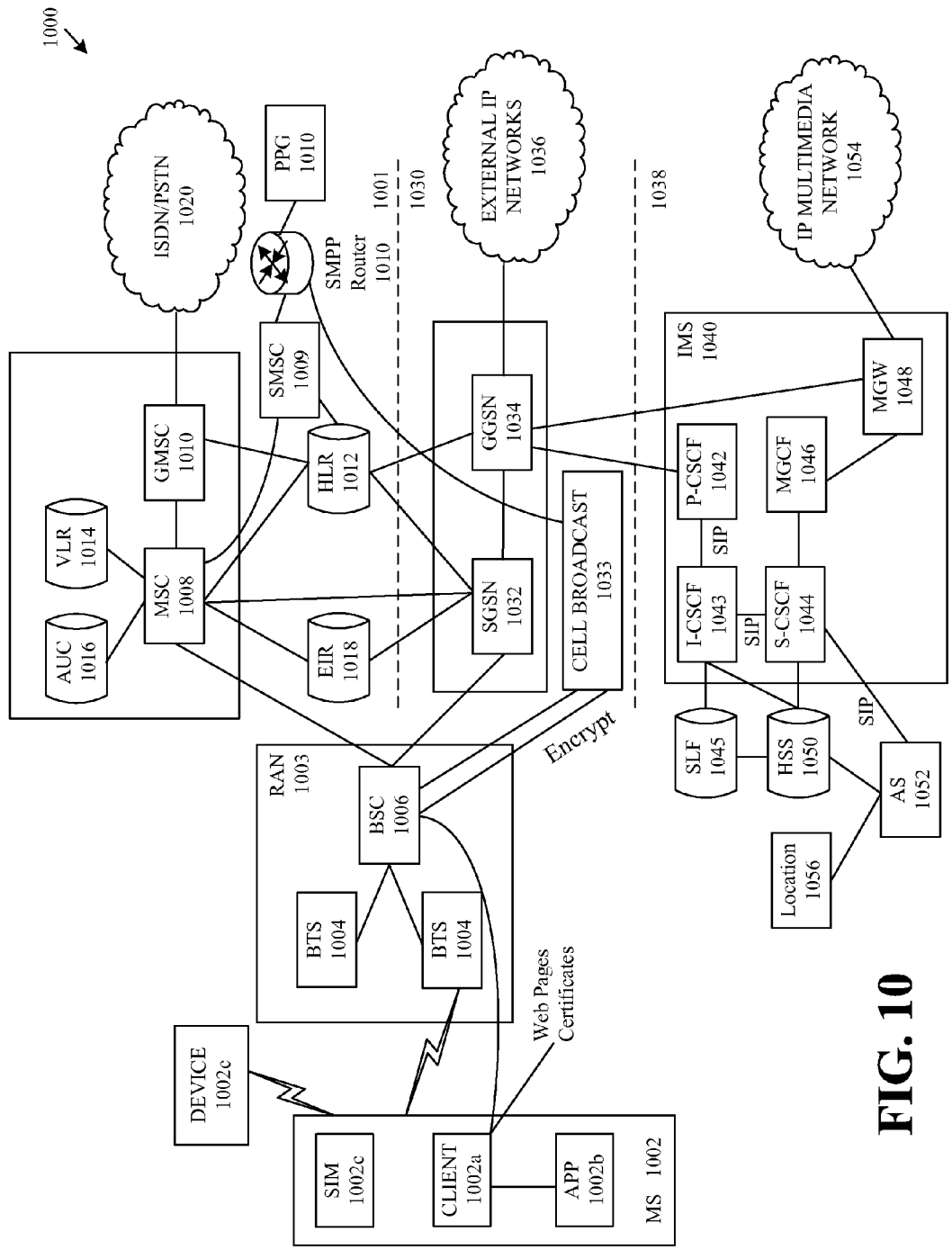
FIG. 10 illustrates an exemplary network environment that facilitates the systems, apparatus, methods and computer-readable storage media described herein.

FIG. 10 illustrates an exemplary network environment that facilitates the systems, apparatus and methods described herein. FIG. 10 depicts a GSM/General packet radio service (GPRS)/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) 1002c. The SIM 1002c includes an International Mobile Subscriber Identity (IMSI), which is a unique device identifier of a subscriber. The MS 1002 includes an embedded client 1002a that receives and processes messages received by the MS 1002. The embedded client 1002a can be implemented in JAVA and is discuss more fully below.

The embedded client 1002a communicates with an application (APP) 1002b that provides services and/or information to an end user. One example of the application can be navigation software that provides near real-time traffic information that is received via the embedded client 1002a to the end user. The navigation software can provide road conditions, suggest alternate routes, etc., based at least in part on the location of the MS 1002. Those of ordinary skill in the art understand that there are many different methods and systems of locating an MS 1002.

Alternatively, the MS 1002 and a device 1002c can be enabled to communicate via a short-range wireless communication link, such as BLUETOOTH® technologies. For example, a BLUETOOTH® SIM Access Profile can be provided in an automobile (e.g., device 1002c) that communicates with the SIM 1002c in the MS 1002 to enable the automobile's communications system to pull information from the MS 1002. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1012 is used to "push" (e.g., send without a synchronous request) content to the MS 1002. The PPG 1012 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. In embodiments, the GGSN provides interworking functionality with external networks, and sets up a logical link to the MS through the SGSN. When packet-switched data leaves the GPRS network, it is transferred to an external Transmission Control Protocol (TCP)-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function (CSCF), of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (e.g., address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISDN User Part (ISUP)/Bearer Independent Call Control (BICC) call control signaling from the external GSTN networks (not shown). It also controls the media gateway (MGW) 1048 that provides user-plane interworking functionality (e.g., converting between Adaptive Multi-Rate (AMR)- and Pulse-code modulation (PCM)-coded voice). The MGW 1048 also communicates with other IP multimedia networks 1054.

In some embodiments, the IP networks 1036 described herein include networks communicatively coupled to social networking sites. As such, the networks disclosed herein can also include such IP networks 1036 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
 a memory to store instructions; and
 a processor, coupled to the memory, that facilitates execution of the instructions to perform operations, comprising:
  generating a multimedia messaging shell;
  enabling concurrent access to a plurality of different types of content, wherein the plurality of different types of content comprise website information;
  receiving a signal indicative of content selected from the plurality of different types of content, wherein the content is to be included in the multimedia messaging shell;
  generating a message comprising the content;
  initiating a first transmission of a first version of the message to a first destination device; and
  initiating a second transmission of a second version of the message to a second destination device, wherein the first version comprises first content comprising text and first website information, wherein the second version comprises second content comprising the text and second website information, and wherein the first website information differs from the second website information.

2. The apparatus of claim 1, wherein the enabling the concurrent access to the plurality of different types of content comprises enabling the concurrent access to contacts information, and wherein the website information comprises a uniform resource locator.

3. The apparatus of claim 2, wherein the enabling the concurrent access further comprises enabling the concurrent access to geographical location information for the apparatus, and wherein the geographical location information for the apparatus comprises a map.

4. The apparatus of claim 1, wherein the message is a multimedia message service text message.

5. The apparatus of claim 1, wherein the operations further comprise:
displaying a menu listing the plurality of different types of content, wherein the displaying is performed prior to the receiving the signal indicative of the content selected from the plurality of different types of content.

6. The apparatus of claim 1, wherein the operations further comprise:
prior to the receiving the signal indicative of the content, receiving a signal indicative of a selected type of the plurality of different types of content.

7. The apparatus of claim 1, wherein the enabling the concurrent access comprises enabling the concurrent access to a social networking data store and to a data store of the apparatus.

8. The apparatus of claim 1, wherein the operations further comprise:
based on determining that digital rights management rules associated with the content allow dissemination of the content, performing the initiating the first transmission or the initiating the second transmission.

9. A method comprising:
developing, by a device comprising a processor, a multimedia messaging shell;
enabling, by the device, concurrent access to different types of content, wherein the different types of content comprise website information;
receiving, by the device, a signal indicative of content selected from the different types of content, wherein the content is to be included in the multimedia messaging shell;
generating, by the device, a message comprising the content;
transmitting, by the device, a first transmission of a first version of the message to a first destination device; and
transmitting, by the device, a second transmission of a second version of the message to a second destination device, wherein the first version comprises first content comprising text and first website information, wherein the second version comprises second content comprising the text and second website information, and wherein the first website information differs from the second website information.

10. The method of claim 9, wherein the enabling the concurrent access to the different types of content comprises enabling the concurrent access to contacts information, and wherein the website information comprises a uniform resource locator.

11. The method of claim 10, wherein the enabling the concurrent access further comprises enabling the concurrent access to geographical location information for the apparatus, and wherein the geographical location information for the apparatus comprises a map.

12. The method of claim 9, wherein the message is a multimedia message service text message.

13. The method of claim 9, further comprising:
displaying, by the device, a menu listing the different types of content, wherein the displaying is performed prior to the receiving the signal indicative of the content selected from the different types of content.

14. The method of claim 9, further comprising:
prior to the receiving the signal indicative of the content, receiving, by the device, a signal indicative of a selected type of the different types of content.

15. The method of claim 9, wherein the enabling the concurrent access comprises enabling the concurrent access to a social networking data store and to a data store of the apparatus.

16. The method of claim 9, further comprising:
based on determining that digital rights management rules associated with the content allow dissemination of the content, performing, by the device, the transmitting the first transmission or the transmitting the second transmission.

17. A computer-readable storage device storing computer-executable instructions that, in response to execution, cause a communication device comprising a processor to perform operations, comprising:
generating a multimedia messaging shell;
enabling concurrent access to different types of content, wherein the different types of content comprise website information;
receiving a signal indicative of content selected from the different types of content, wherein the content is to be included in the multimedia messaging shell;
generating a message comprising the content;
facilitating a first transmission of a first version of the message to a first destination device; and
facilitating a second transmission of a second version of the message to a second destination device, wherein the first version comprises first content comprising text and first website information, wherein the second version comprises second content comprising the text and second website information, and wherein the first website information differs from the second website information.

18. The computer-readable storage device of claim 17, wherein the enabling the concurrent access to the different types of content comprises enabling the concurrent access to contacts information, and wherein the website information comprises a uniform resource locator.

19. The computer-readable storage device of claim 18, wherein the enabling the concurrent access further comprises enabling the concurrent access to geographical location information for the apparatus, and wherein the geographical location information for the apparatus comprises a map.

20. The computer-readable storage device of claim 17, wherein the operations further comprise:
prior to the receiving the signal indicative of the content selected from the different types of content, displaying a menu listing the different types of content, wherein the displaying is performed.

* * * * *